United States Patent
Rojas et al.

(10) Patent No.: US 12,552,104 B2
(45) Date of Patent: Feb. 17, 2026

(54) ADDITIVELY MANUFACTURED ENGINEERED FINGERPRINT (AMEF) ANTENNA AND RELATED DETECTION

(71) Applicant: Embry-Riddle Aeronautical University, Inc., Daytona Beach, FL (US)

(72) Inventors: Eduardo Antonio Rojas, Port Orange, FL (US); Noemi Miguélez-Gòmez, Cambridge, MA (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 457 days.

(21) Appl. No.: 18/158,007

(22) Filed: Jan. 23, 2023

(65) Prior Publication Data
US 2023/0234292 A1    Jul. 27, 2023

Related U.S. Application Data

(60) Provisional application No. 63/302,430, filed on Jan. 24, 2022.

(51) Int. Cl.
  *B29C 64/386*  (2017.01)
  *B33Y 10/00*  (2015.01)
  (Continued)

(52) U.S. Cl.
  CPC ............ *B29C 64/386* (2017.08); *B33Y 10/00* (2014.12); *B33Y 50/00* (2014.12); *B33Y 80/00* (2014.12); *H01Q 9/0407* (2013.01)

(58) Field of Classification Search
  CPC ....... B29C 64/386; B33Y 10/00; B33Y 50/00; B33Y 80/00; H01Q 9/0407; H01Q 9/0428; H04W 12/12; H04W 12/79
  See application file for complete search history.

(56) References Cited

U.S. PATENT DOCUMENTS

| | | |
|---|---|---|
| 7,346,359 B2 | 3/2008 | Damarla et al. |
| 8,180,367 B2 | 5/2012 | Gilad et al. |

(Continued)

FOREIGN PATENT DOCUMENTS

| | | |
|---|---|---|
| CN | 102693411 B | 5/2014 |

OTHER PUBLICATIONS

"CERT Advisory: IP Spoofing Attacks and Hijacked Terminal Connections", Computer Emergency Response Team (CERT). [online]. Retrieved from the Internet: <URL: http://www.cert.org/advisories/CA-1995-01.html>, (Jan. 1995), 7 pgs.

(Continued)

*Primary Examiner* — Dhaval V Patel
(74) *Attorney, Agent, or Firm* — Schwegman Lundberg & Woessner, P.A.

(57) ABSTRACT

Antenna structures can include an additively manufactured engineered fingerprint (AMEF). AMEF antenna features facilitate individual or type classification of an unknown source antenna. As described herein, physical features can be included in an additively manufactured antenna to facilitate source identification, such as without sacrificing antenna performance. In general, AMEF techniques can improve physical layer security, such as without dramatically increasing production cost or decreasing production throughput, as compared to other approaches.

20 Claims, 12 Drawing Sheets

(51) Int. Cl.
  *B33Y 50/00* (2015.01)
  *B33Y 80/00* (2015.01)
  *H01Q 9/04* (2006.01)

(56) References Cited

U.S. PATENT DOCUMENTS

| | | | |
|---|---|---|---|
| 9,591,013 B2 | 3/2017 | Baxley et al. | |
| 11,184,783 B1* | 11/2021 | Melodia | G06N 3/084 |
| 2020/0052428 A1* | 2/2020 | Cho | H01R 12/73 |
| 2021/0044020 A1* | 2/2021 | Liu | H01Q 9/0414 |
| 2021/0066573 A1* | 3/2021 | Parsche | H10N 30/2047 |
| 2021/0399420 A1* | 12/2021 | Li | H01Q 5/35 |

OTHER PUBLICATIONS

"Design a Deep Neural Network With Simulated Data to Detect WLAN Router Impersonation", The MathWorks, Inc. [online]. [retrieved Feb. 2, 2023]. Retrieved from the Internet: <URL: https://www.mathworks.com/help//comm/ug/design-a-deep-neural-network-with-simulated-data-to-detect-wlan-router-impersonation.html>, (2021), 13 pgs.

"FTP Security Considerations", IETF, RFC 2577 [online]. Retrieved from the Internet: <URL: https://www.rfc-editor.org/rfc/rfc2577., (May 1999), 8 pgs.

"Test a Deep Neural Network With Captured Data to Detect WLAN Router Impersonation", The MathWorks, Inc. [online]. Retrieved from the Internet: <URL: http://www.mathworks.com/help//comm/ug/test-a-deep-neural-network-with-captured-data-to-detect-wlan-router-impersonation.html>, (2021), 10 pgs.

Agadakos, I., et al., "Chameleons' oblivion: Complex-valued deep neural networks for protocal-agnostic RF device fingerprinting", Proc. IEEE European Symposium on Security and Privacy (EuroS P), (2020), 322-338.

Al-Shawabka, A., et al., "Exposing the fingerprint: Dissecting the impact of the wireless channel on radio fingerprinting", Proc. IEEE INFOCOM 2020—IEEE Conference on Computer Communications, Jul. 6-9, 2020, (2020), 646-655.

Antonopoulos, A., et al., "Security and trust in the analog/mixed-signal/RF domain: A survey and a perspective", Proc. 22nd IEEE European Test Symposium (ETS), (2017), 1-10.

Antonopoulos, A., et al., "Trusted Analog/mixed-Signal/RF IC's: A Survey and a Perspective", IEEE Design Test, vol. 34, No. 6, (Nov./Dec. 2017), 63-76.

Balakrishnan, S., et al., "Physical Layer Identification Based on Spatial-Temporal Beam Features for Millimeter-Wave Wireless Networks", IEEE Transactions on Information Forensics and Security, vol. 15, (2020), 1831-1845.

Bhunia, S., et al., "Hardware Trojan Attacks: Threat Analysis and Countermeasures", Proceedings of the IEEE, vol. 102, No. 8, (Aug. 2014), 1229-1247.

Castro, J., et al., "Fabrication, Modeling, and Application of Ceramic-Thermoplastic Composites for Fused Deposition Modeling of Microwave Components", IEEE Transactions on MicrowaveTheory and Techniques, 65(9), (Jun. 2017), 2073-2084.

Chang, J., et al., "Wireless Physical-Layer Identification Assisted 5G Network Security", Proc. IEEE INFOCOM Conference Computational Communication Workshops (INFOCOM Workshops), (2019), 1-5.

Chatterjee, B., et al., "RF-PUF: Enhancing IoT Security Through Authentication of Wireless Nodes Using In-Situ Machine Learning", IEEE Internet of Things Journal, vol. 6, No. 1, (Feb. 2019), 388-398.

Delvaux, J., et al., "Machine-Learning Attacks on PolyPUFs, OB-PUFs, RPUFs, LHS-PUFs, and PUF-FSMs", IEEE Transactions on Information Forensics and Security, vol. 14, No. 8, (Aug. 2019), 2043-2058.

Ezuma, M., et al., "Detection and Classification of UAVs Using RF Fingerprints in the Presence of Wi-Fi and Bluetooth Interference", IEEE Open Journal of Communications, vol. 1, (2020), 60-76.

Fadul, M., et al., "Nelder-Mead Simplex Channel Estimation for the RF-DNA Fingerprinting of OFDM Transmitters Under Rayleigh Fading Conditions", IEEE Transactions om Information Forensics and Security, vol. 16, (2021), 2381-2396.

Gungor, O., et al., "On the Basic Limits of RF-Fingerprint-Based Authentication", IEEE Transactions on Information Theory, vol. 62, No. 8, (Aug. 2016), 4523-4543.

Hastings, N. E., et al., "TCP/IP spoofing fundamentals", Proceedings of the 1996 IEEE Fifteenth Annual International Phoenix Conference on Computers and Communications, (Mar. 1996), 218-224.

Kieyzuin, A., et al., "Automatic creation of SQL injection and cross-site scripting attacks", Proc. IEEE 31st International Conference on Software Engineering (ICSE '09), Vancouver, BC, Canada, (May 2009), 199-209.

Kuzmanovic, A., et al., "Low-Rate TCP-Targeted Denial of Service Attacks and Counter Strategies", IEEE/ACM Transactions on Networking, 14(4), (Aug. 2006), 683-696.

Lukacs, M. W., et al., ""RF-DNA" Fingerprinting for Antenna Classification", IEEE Antennas and Wireless Propagation Letters, vol. 14, (2015), 1455-1458.

Ma, Y., et al., "Antenna Classification Using Gaussian Mixture Models (GMM) and Machine Learning", IEEE Open Journal of Antennas Propagation, vol. 1, (2020), 320-328.

Merchant, K., et al., "Deep Learning for RF Device Fingerprinting in Cognitive Communication Networks", IEEE Journal of Selected Topics in Signal Processing, vol. 12, No. 1, (Feb. 2018), 160-167.

Miguelez-Gomez, Noemi, et al., "Antenna Additively Manufactured Engineered Fingerprinting for Physical Layer Security Enhancement for Wireless Communications", IEEE Open Journal of Antennas and Propagation, vol. 3, (Jun. 8, 2022), 637-651.

Miquelez-Gomez, N., et al., "Thickness-accommodation in X-band origami-based reflectarray antenna for small satellites applications", Proc. IEEE International Conference on Wireless for Space and Extreme Environments (WiSEE), (2020), 54-59.

Mpitziopoulos, D., et al., "A Survey on Jamming Attacks and Countermeasures in WSNs", IEEE Communication Surveys & Tutorials, 11(4), (2009), 42-56.

Nagarajan, V., et al., "Using Power Hopping to Counter MAC Spoof Attacks in WLAN", 2010 7th IEEE Consumer Communications and Networking Conference, Jan. 9-12, 2010, (Jan. 2010), 1-5.

Park, J. C., "Securing Ad Hoc Wireless Networks Against Data Injection Attacks Using Firewalls", Proc. IEEE Wireless Communication Network Conference, Hong Kong, (Apr. 2008), 2843-2848.

Peng, L., et al., "Design of a Hybrid RF Fingerprint Extraction and Device Classification Scheme", IEEE Internet of Things Journal, vol. 6, No. 1, (Feb. 2019), 349-360.

Perrig, A., et al., "Security in wireless sensor networks", Communications of the ACM, 47(6), (Jun. 2004), 53-57.

Radhakrishnan, S. V., "GTID: A technique for physical device and device type fingerprinting", IEEE Transactions on Dependable and Secure Computing, 12(5), (Sep./Oct. 2015), 519-532.

Rojas-Nastrucci, E. A., et al., "Characterization and Modeling of K-Band Coplanar Waveguides Digitally Manufactured Using Pulsed Picosecond Laser Machining of Thick-Film Conductive Paste", IEEE Transactions on Microwave Theory and Techniques, 65(9), (Sep. 2017), 3180-3187.

Rostami, F., et al., "A Primer on Hardware Security: Models, Methods, and Metrics", Proceedings of the IEEE, vol. 102, No. 8, pp. , (Aug. 2014), 1283-1295.

Sanke, K., et al., "ORACLE: Optimized radio classification through convolutional neural networks", IEEE INFOCOM 2019—IEEE Conference on Computer Communications, Paris, France, (2019), 370-378.

Shen, G., "Towards scalable and channel-robust radio frequency fingerprint identification for LoRa", [online] arXiv:2107:02867v1 [eess.SP] Jul. 6, 2021, (2021), 12 pgs.

Soltanieh, N., et al., "A Review of Radio Frequency Fingerprinting Techniques", IEEE Journal of Radio Frequency Identification, 4(3), (Sep. 2020), 222-233.

(56) References Cited

OTHER PUBLICATIONS

Wang, W., et al., "User Capacity of Wireless Physical-layer Identification: An Information-theoretic Perspective", 2016 IEEE International Conference on Communications (ICC), May 22-27, 2016, (2016), 1-6.

Wang, W., et al., "Wireless Physical-Layer Identification: Modeling and Validation", IEEE Transactions on Information Forensics and Security, 11(9), (2016), 2091-2106.

Wu, T. L., et al., "Design of a Low Profile and Compact Omnidirectional Filtering Patch Antenna", IEEE Access, vol. 5, (2017), 1083-1089.

Youssef, K., et al., "Machine Learning Approach to RF Transmitter Identification", IEEE Journal of Radio Frequency Identification, 2(4), (Dec. 2018), 197-205.

Yu, X., et al., "Interconnect-Based PUF With Signature Uniqueness Enhancement", IEEE Transactions on Very Large Scale Integration (VLSI) Systems, vol. 28, No. 2, (Feb. 2020), 339-352.

Zha, H., et al., "Real-World ADS-B Signal Recognition Based on Radio Frequency Fingerprinting", Proc. IEEE 28th International Conference Networking Protocols (ICNP), (2020), 1-6.

Zhang, Z., et al., "Improved Adam Optimizer for Deep Neural Networks", 2018 IEEE/ACM 26th International Symposium on Quality of Service (IWQoS), Jun. 4-6, 2018, (2018), 1-2.

Zheng, D., et al., "Multifunctional leaky-wave antenna with tailored radiation and filtering characteristics based on flexible mode-control principle", IEEE Open Journal of Antennas Propagation, vol. 2, (2021), 858-869.

Zou, Y., et al., "A Survey on Wireless Security: Technical Challenges, Recent Advances, and Future Trends", Proceedings of the IEEE, 104(9), (Sep. 2016), 1727-1765.

\* cited by examiner

ADDITIVELY MANUFACTURED ENGINEERED FINGERPRINT (AMEF) ANTENNA AND RELATED DETECTION

CLAIM OF PRIORITY

This patent application claims the benefit of priority of Rojas et al., U.S. Provisional Patent Application Ser. No. 63/302,430, titled "ADDITIVELY MANUFACTURED ENGINEERED FINGERPRINT (AMEF) ANTENNA AND RELATED DETECTION," filed on Jan. 24, 2022, which is hereby incorporated by reference herein in its entirety.

STATEMENT REGARDING FEDERALLY SPONSORED RESEARCH OR DEVELOPMENT

This invention was made with government support under award number 1944599 awarded by the National Science Foundation. The government has certain rights in the invention.

FIELD OF THE DISCLOSURE

This document pertains generally, but not by way of limitation, to additive manufacturing of electrical structures, and more particularly to techniques for additive manufacturing of antenna structures and classifying such structures.

BACKGROUND

Wireless data links may present exploitable vulnerabilities. Techniques to attack such wireless links are advancing and becoming more unpredictable. As illustrative examples, a communication system may present vulnerabilities to attacks involving data falsification, source impersonation, or unauthorized access. Generally, wireless networks can be defined by different protocol layers that present specific constraints to establish a prevailing level of security. For wireless networks, security is established at least through some combination of aspects including authenticity, confidentiality, integrity, and availability. In the authenticity aspect, a source of the data must be identifiable to distinguish between legitimate and illegitimate sources or users. With respect to the confidentiality aspect, data must be accessed only by authorized users. With respect to the integrity aspect, information shared in wireless networks must be reliable, preventing the system from allowing data falsification, modification, or susceptibility to error. With respect to the availability aspect, legitimate users must have access to the system, such as upon request. For example, a Denial of Service (DoS) attack might prevent continuous or even intermittent use of a wireless network resource. Software or firmware-based tools for security have been developed and used extensively in wireless communications systems. Such techniques may include cryptographic algorithms, for example, to enable data encryption, or other security measures.

SUMMARY OF THE DISCLOSURE

Physical layer security can refer to techniques to enhance the security of wireless communications at the physical (e.g., hardware) level of abstraction. The present inventors have recognized, among other things, that a radio frequency (RF) "fingerprint" can be established using additively manufactured antennas, and such a fingerprint can be used to provide hardware-based security, such as uniquely identifying an individual antenna structure or a class of antenna structures at least in part by establishing physical features unique to the antenna structure or to a class of antenna structures, using an additive manufacturing technique.

The present inventors have recognized, among things, that antenna structures can include an additively manufactured engineered fingerprint (AMEF). An AMEF can be established using 3D printing and can enable signal source identification or classification. Examples herein include use of a model (e.g., a machine learning or other analytical model), such as a convolutional neural network (CNN), to classify an unknown source (such as an antenna) using a received representation of transmitted digital data. For example, such data can include raw in-phase and quadrature data corresponding to a portion of a wireless networking protocol frame (e.g., a digitized portion of a training signal comprising a portion of a preamble). As described herein, physical features can be included in an additively manufactured antenna to facilitate source identification, such as without sacrificing antenna performance. In general, AMEF techniques can improve physical layer security, such as without dramatically increasing production cost or decreasing production throughput. AMEF antenna features facilitate individual or type classification of an unknown source antenna.

In an example, a technique such as a model training method can include wirelessly transmitting a modulated signal using specified frequency ranges using a first antenna, wirelessly receiving and digitizing first received signals in the specified frequency ranges corresponding to the wirelessly transmitted modulated signal from the first antenna, wirelessly transmitting a modulated signal using specified frequency ranges using a second antenna, wirelessly receiving and digitizing second received signals in the specified frequency ranges corresponding to the wirelessly transmitted modulated signal from the second antenna, and establishing a model using the first received signals and the second received signals, the model established to classify a third received signal as corresponding to either the first antenna or the second antenna. The first antenna and the second antenna are generally manufactured with physical features that cause the first antenna and the second antenna to differ in electrical performance when transmitting the modulated signal. For example, the first antenna and the second antenna can be fabricated using an additive manufacturing technique.

In an example, a technique such as a method for classifying an antenna can include wirelessly receiving and digitizing a received signal corresponding to a wirelessly transmitted modulated signal and applying the received signal to an established model to classify the received signal as corresponding to either a first antenna or a second antenna. The first antenna and the second antenna can be manufactured (such as additively manufactured) with physical features that cause the first antenna and the second antenna to differ from each other in electrical performance when transmitting the modulated signal.

In an example, a technique, such as a method for fabricating an antenna having a fingerprint detectable using an established model, can include fabricating a first antenna and a second antenna using an additive manufacturing technique, the additive manufacturing technique comprising depositing a conductive layer on a dielectric material, the first antenna and the second antenna including respective physical features that cause the first antenna and the second antenna to differ in electrical performance when transmitting a modulated signal. The first antenna and the second antenna can each be configured to operate using specified frequency ranges including providing a specified return loss in the specified frequency ranges.

This summary is intended to provide an overview of subject matter of the present patent application. It is not intended to provide an exclusive or exhaustive explanation of the invention. The detailed description is included to provide further information about the present patent application.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Additive manufacturing generally refers to techniques involving deposition of material, such as by spraying, dispensing, or extrusion, for example, to form mechanical or electrical structures in an additive manner. Examples of generally available additive manufacturing approaches include polymer jetting (e.g., involving depositing a polymer material which is then cured), fused deposition molding, or dispensing of paste materials such as comprising a paste composition having a conductive species. Generally, additive manufacturing (AM) techniques such as aerosol jet printing (AJP), laser-enhanced direct print (LE-DPAM), and inkjet printing can be used at least in part for fabrication of flexible, high-performance, electronics and structures, e.g., RF circuits, antennas, sensors, or metamaterials, such as structures having tailored mechanical, electrical, or optical properties. Additive manufacturing facilitates fabrication of structures such as extending along or protruding from nonplanar surfaces, even conforming to curved or irregular surfaces. Additive manufacturing also permits flexibility in manufactured structures, such as permitting variation, iteration, or fabrication of entirely different structural configurations with minimal re-tooling.

In general, the present inventors have recognized, among other things, that an additive manufacturing approach can be used for antenna fabrication. For example, an additive manufacturing process can be used to establish physical antenna features that facilitate antenna classification, such as without otherwise compromising antenna performance (e.g., radiation efficiency, directivity, return loss, or the like). Generally, antenna structures and fabrication techniques described herein can be used to facilitate classification of transmissions received from an unknown source antenna. Such classification can be used to identify an unknown source antenna as a unique article, or as belonging to a class of similar antennas.

Figure 1:
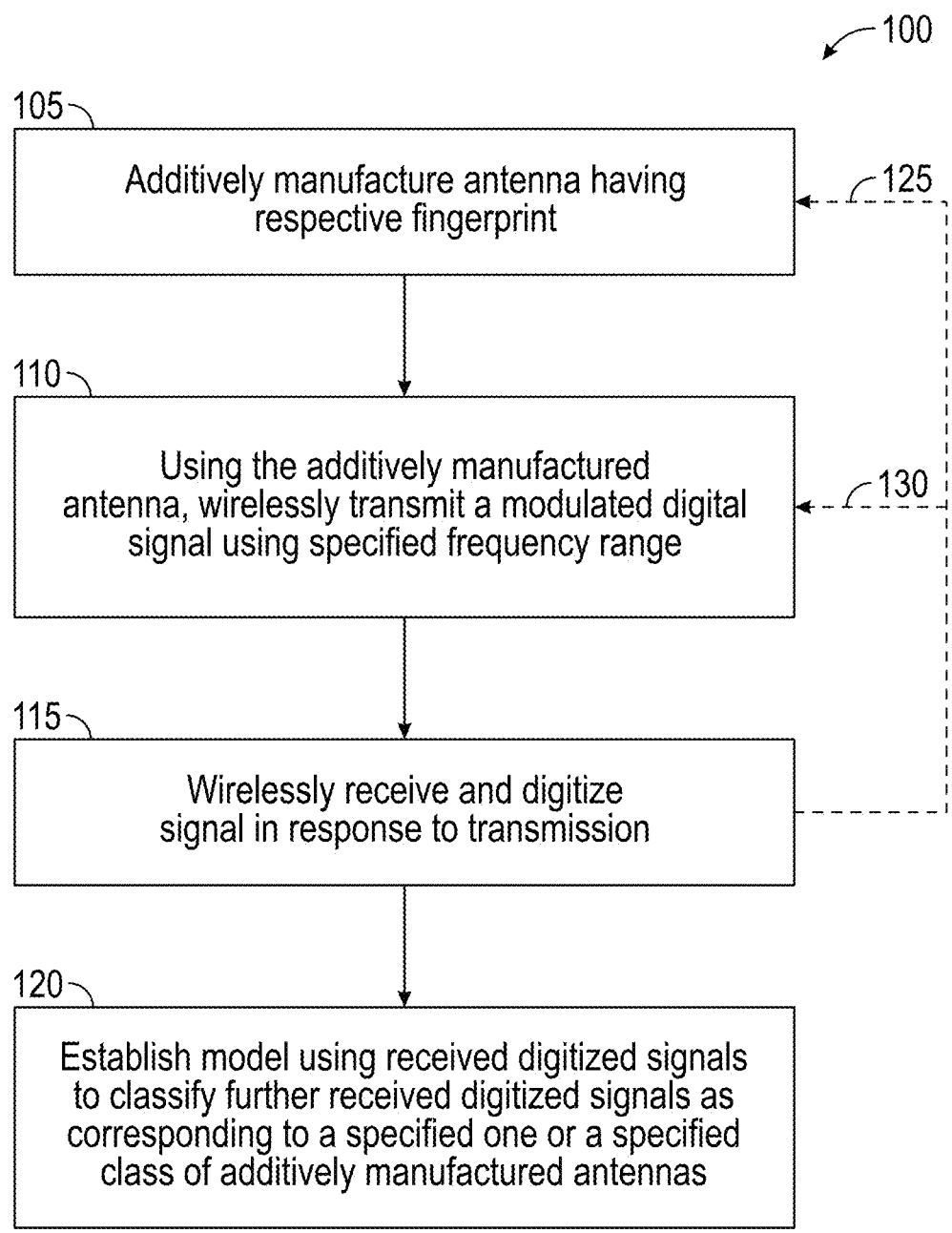
FIG. 1 illustrates generally a technique, such as an automated or semi-automated method, for establishing a model for use in classifying an additively manufactured antenna structure.

FIG. 1 illustrates generally a technique, such as an automated or semi-automated method 100, for establishing a model for use in classifying a manufactured antenna structure. At 105, an antenna structure can be additively manufactured, such as using one or more processes as shown and described elsewhere herein. At 110, using the additively manufactured antenna, a modulated signal (e.g., a signal to be transmitted formed using a digital modulation scheme) can be wirelessly transmitted using a specified frequency range. At 115, the transmitted signal can be received and digitized, and at 120, a model can be established using respective received digitized signals to classify further received signals (e.g., from an unknown source antenna) as corresponding to a specified one or a specified class of antennas.

Such training can occur in an iterative manner using a multiple transmit-receive scenarios at 130 (e.g., different locations, channels, or other configurations for the same antenna structure), or multiple antenna structures can be tested iteratively at 125 where respective antenna structures are manufactured at 105, and then used to transmit at 110 for a receiver to capture and digitize such transmissions at 115. For example, respective first and second antenna structures can be manufactured with physical features that cause the first antenna and the second antenna to differ in electrical performance when transmitting the modulated signal. The first and second antennas can be respectively used to transmit modulated signals. The resulting received signals can be digitized and used to train a model such as a convolutional neural network, which can then be instantiated for further use in classification of an unknown source antenna as corresponding to either the first or the second antenna.

Figure 2:
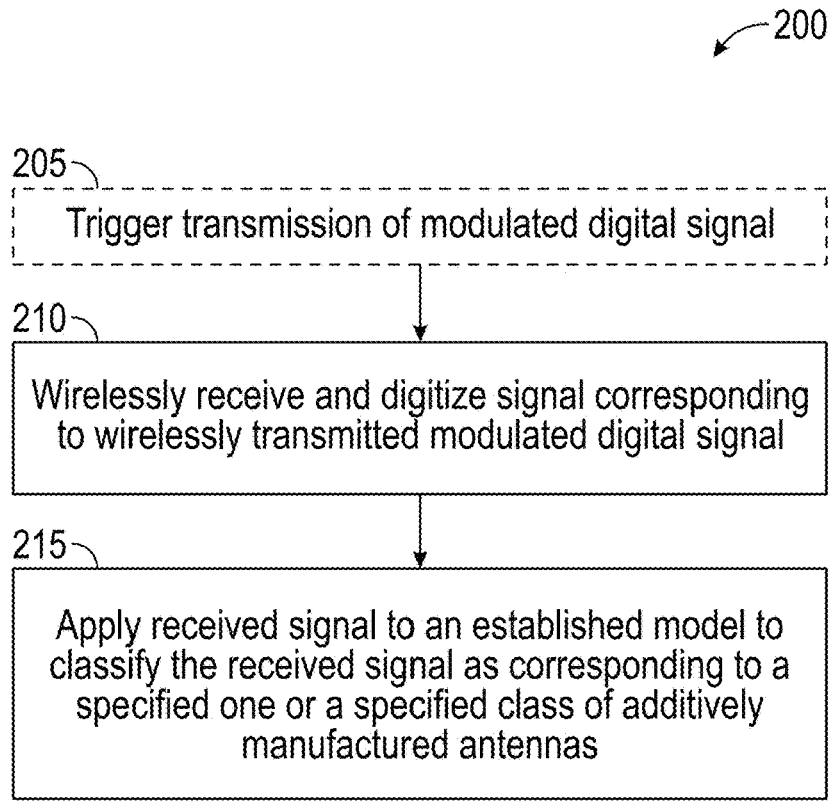
FIG. 2 illustrates generally a technique, such as an automated or semi-automated method, for applying a received signal to a model for use in classifying an additively manufactured antenna structure, such as a model trained using the approach of FIG. 1.

FIG. 2 illustrates generally a technique, such as an automated or semi-automated method 200, for applying a received signal to a model for use in classifying an antenna structure (e.g., an additively manufactured antenna), such as a model trained using the approach of FIG. 1. At 210, a signal corresponding to a wirelessly-transmitted modulated signal can be received and digitized. At 215, the received signal can be applied to an established model (such as a convolutional neural network), to classify the received signal as corresponding to a specified one or a specified class of manufactured antennas. For example, if first and second antennas are manufactured with physical features that cause the first antenna and the second antenna to differ in electrical performance when transmitting the modulated signal, the model established at 215 can be used to classify a digitized representation of a received signal as corresponding to one of the first antenna or the second antenna. Optionally, at 205, transmission of a modulated signal can be triggered, such as in response to an interrogation or authentication command, or according to a wireless communication protocol. For example, the modulated signal can include at least one training sequence, such as at least one protocol data unit (PDU) including a preamble comprising the training sequence.

TABLE 1, below presents abstraction layers used in wireless systems, the main protocols and specifications of these layers, and the main types of attacks to which they are vulnerable. RF hardware security mechanisms aim to protect wireless systems taking advantage of physical devices. RF fingerprinting can be used as an identification and authentication mechanism for the physical layer of wireless networks. RF fingerprinting generally involves use of unique and distinctive fingerprints in the signals from components of the system to differentiate a source of signals. Such fingerprints can be extracted and analyzed from the incoming signal features. In applications with a high count of sources, signatures can be superimposed on each other, and a system may not be able to accurately identify or classify such fingerprints. To enhance detectability of fingerprint features, such features are generally desired to be difficult to replicate and as distinctive as possible. RF transmitter features for fingerprinting may include introduction of imbalance in phase and amplitude due to imperfections added during the manufacturing process of the RF components of the system. Use of fingerprinting techniques are applicable to a wide range of applications and systems, including aircraft classification using Automatic Dependent Surveillance-Broadcast (ADS-B) aviation datalinks, and source detection and classification in IEEE 802.11, as illustrative examples.

TABLE 1

WIRELESS NETWORK OSI LAYER ARCHITECTURE SPECIFICATIONS AND CORRESPONDING ATTACKS

| OSI Layer | Protocols and Specifications | Security Attacks | Attack Characteristics/ Specifications |
|---|---|---|---|
| Application | HTTP, FTP, SMTP | malware attack, FTP bounce | Internal malicious software, user impersonation |
| Transport | TCP, UDP | TCP/UDP flooding | Overload of fake requests and data packets |
| Network | IP, ICMP | IP spoofing and hijacking | Falsification and impersonation of IP addresses |
| MAC | CSMA, CDMA, OFDMA | MAC spoofing, network injection | Falsification of source ID, unauthorized transmissions |
| PHY | Transmission Medium, Modulation | Eavesdropping, jamming | Unauthorized access to data, transmission interruption |

Machine learning techniques can be used in support of RF fingerprinting methods to establish or improve classification accuracy even in adverse channel conditions. Among others, machine learning models such as Support Vector Machines (SVM), Deep Neural Networks (DNN), and Convolutional Neural Networks (CNN) can be used for identification and classification of Orthogonal Frequency-Division Multiplexing (OFDM) frames. OFDM frames present characteristics that can improve the accuracy of the system, and while unique transmitter identification techniques have been analyzed for these signals, device type classification approaches present challenges. For example, components used internally in deployed 802.11 network equipment may be difficult or impossible to physically update. However, antennas used in wireless systems may be upgradeable or replaceable, such as providing a field update capability at the physical layer of the system.

In one approach, a radar antenna can be actively interrogated with noise-based waveforms to identify its type and its terminations. Such an approach can show a classification accuracy above 75% for different Signal to Noise Ratio (SNR) conditions, but such an approach may depend on additional transmission and reception hardware or signaling (e.g., an active interrogation approach). By contrast, the present inventors have developed, among other things, classification and identification of RF sources using additively manufactured antennas, which does not require the interrogation-based approach of the radar example mentioned above.

An AMEF approach generally involves intentionally modifying a fingerprint of RF transceivers such as leveraging a unique antenna fingerprint to enhance the security of a wireless system. Additive manufacturing (AM) can be used to fabricate antennas with unique features, per unit produced or across type, hence providing a unique RF signature impact to each device or to a class of similar devices. With the AMEF technique, a potentially unreliable source would generally be unable to replicate unique hardware features of the AMEF antenna structure, along with other elements in the transmitter signal chain. Accordingly, such an unreliable source would be precluded from spoofing a receiving system. Generally, the present inventors have recognized that antenna geometry features can result in changes in parameters that can be exploited to extract received signal features for the identification of the source of the received signals. As an illustrative example, antennas with physical features such as vias or holes can have different impulse response or frequency response characteristics.

Figure 3:
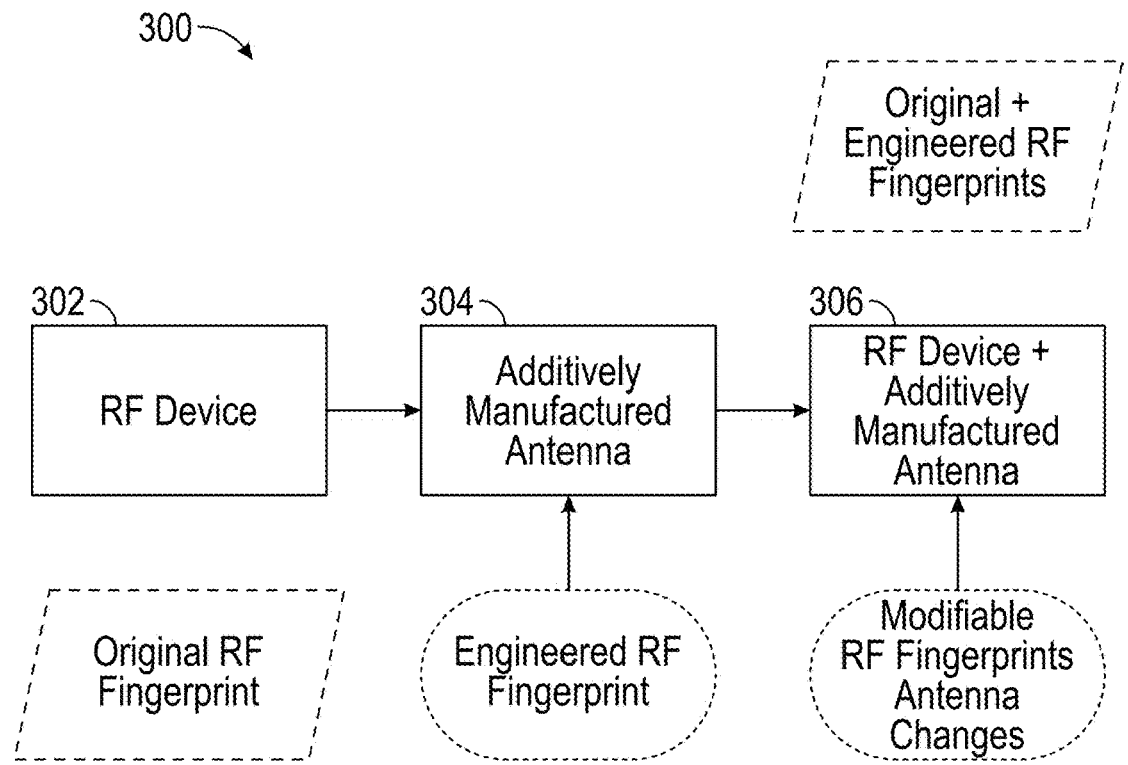
FIG. 3 illustrates generally a visualization of a radio frequency (RF) fingerprinting approach.

FIG. 3 illustrates generally a visualization of a radio frequency (RF) fingerprinting approach. In general, an RF device 302 (e.g., a transmitter) can be coupled to an additively manufactured antenna 304 to provide a combined transmitter and antenna structure 306 having a combination of an original fingerprint associated with the RF device 302 and an engineered fingerprint associated with the antenna 304. The fingerprint of the combined transmitter and antenna structure 306 can be modified such as by substitution or selection of a different additively manufactured antenna 304.

Generally, addition of individual features to provide engineered fingerprints in manufactured antennas can be costly and time consuming due to associated manufacturing process modifications. By contrast, the present inventors have recognized that use of additive manufacturing techniques need only involve a different set of manufacturing instructions (e.g., fabrication data) to provide respective antenna configurations with specified physical features, without otherwise requiring modification of the manufacturing process or tooling. Antenna substitution or upgrades would allow ongoing replacement of antenna structures in systems such as 5G or Internet-of-Vehicles applications. Various illustrative examples in this document show classification approaches across frequency and antenna position, along with individual and antenna type classification capabilities of the AMEF approach.

Described in the illustrative examples below, a total of nine additively manufactured antenna samples from three antenna configurations of right hand circularly polarized (RHCP) truncated corner probe fed (TCPF) patches are used, showing a 100% antenna classification accuracy in some cases, for specific frequency channels, antenna positions, and antenna sample configurations for convolutional neural network training and testing. The source identification capabilities of the AMEF technique allow a new authentication approach for wireless communication systems. Generally, the approach described herein for the illustrative examples below involves (1) additively manufactured antennas with engineered fingerprints, (2) a testbed setup for data collection, and (3) a convolutional neural network to implement the classification for evaluation.

Figure 4:
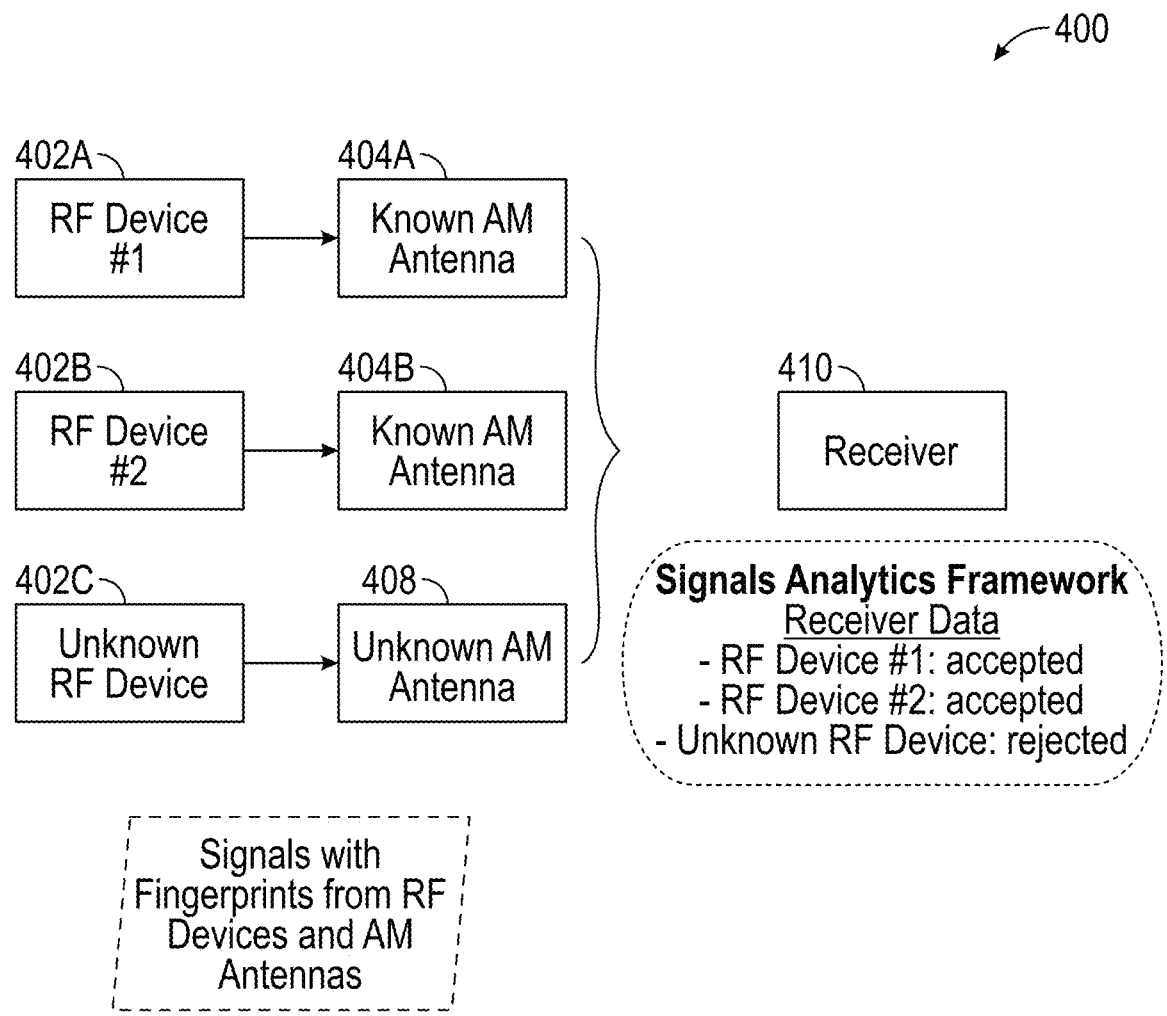
FIG. 4 illustrates generally a visualization of an application of an AMEF fingerprinting approach.

FIG. 4 illustrates generally a visualization of an application of an AMEF fingerprinting approach 400. A first transmitter 402A can be coupled to a first additively manufactured (AM) antenna 404A and a receiver 410 can be used to receive and digitize a modulated signal provided by the first antenna 404A. A second transmitter 402B can be coupled to a second antenna 404B and the receiver 410 can be used to receive and digitize a modulated signal provided by the second antenna 404B. Data received by the receiver can be used to establish a model to classify an unknown antenna 408 coupled to an unknown transmitter 402C as either corresponding to the first or second antennas 404A or 404B, or as failing to correspond to either the first or the second antennas 404A or 404B. Use of "first" and "second" antennas is merely illustrative, and the classification approach can be used with as few as a single known antenna or antenna type, or many antennas or antenna types.

Generally, the antenna structures described herein as illustrative examples include physical features to aid classification. A manufacturing process of the antennas may also generate processing variations or defects to the antennas that can be used to differentiate antennas from each other; however, when a count of antennas increases, or the antennas present similar features between samples of the same or different type, the accuracy of their classification may be confounded by production variation or defects. Use of intentionally added physical features can provide more reliable classification rather than relying upon process variations or defects exclusively for such classification.

Three different additively manufactured antenna configurations (e.g., labeled as "designs") are discussed in detailed examples below by way of illustration, for evaluation of individual sample and antenna type classification. In this manner, such examples show that an unknown source antenna can be verified as corresponding to a known (and valid) source antenna sample (e.g., a unique individual antenna) or class (e.g., type of antenna). If an unknown source antenna fails to correspond to a known source antenna sample or type, signals from the unknown antenna can be rejected or otherwise deemed non-authentic.

Figure 5:
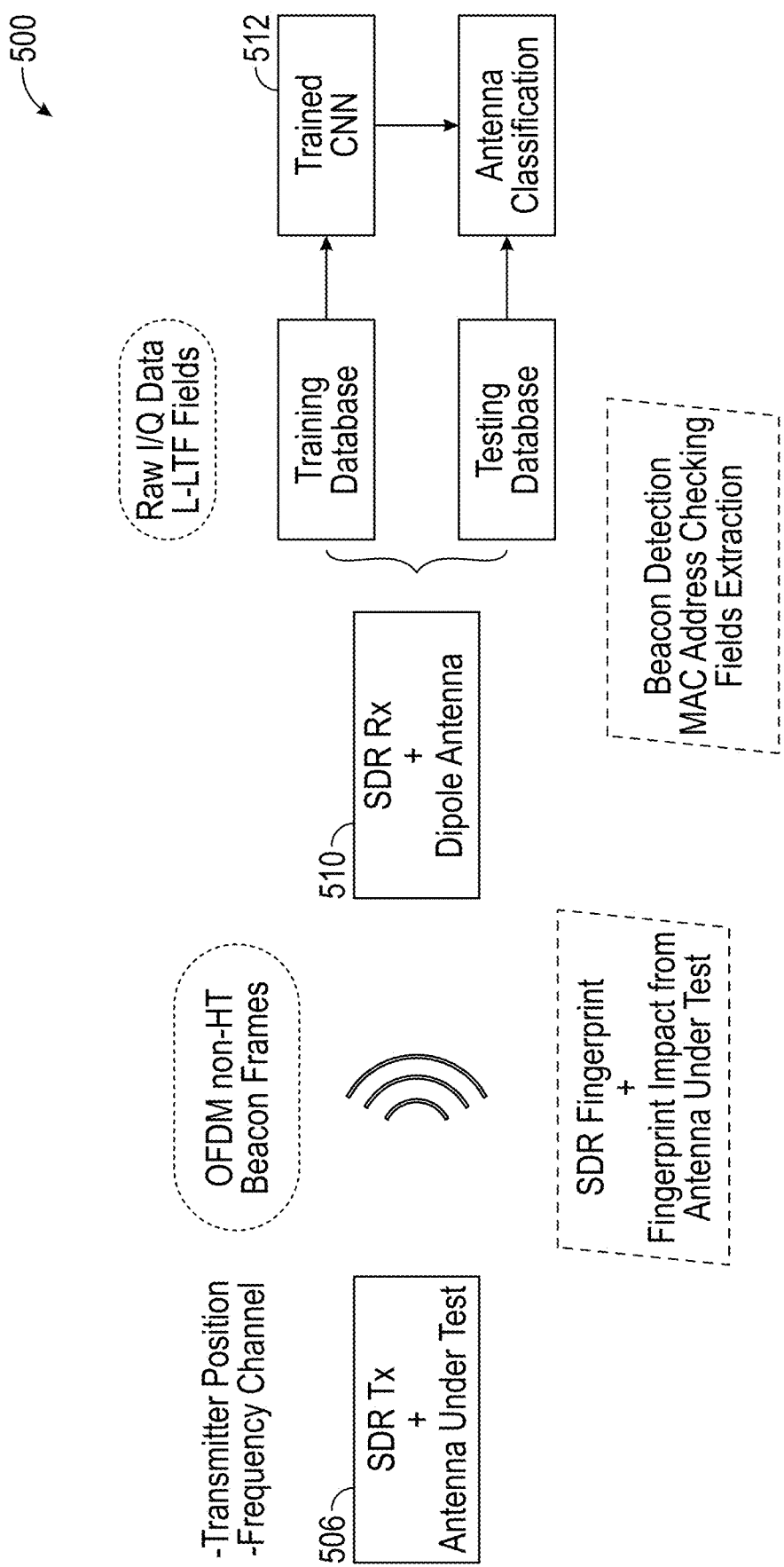
FIG. 5 illustrates generally a visualization of a classification framework including a transmitter, a receiver, and a model instance.

FIG. 5 illustrates generally a visualization of a classification framework 500 including a transmitter 506 and antenna under test, a receiver 510, and a model instance 512. As mentioned above, a testbed for evaluation of the illustrative examples herein comprised software-defined radios (SDRs) (such as within transmitter 506) configured to transmit IEEE 802.11 (Wi-Fi) signals in the 5 GHz band. In various illustrative examples below, a commonly shared testbed setup was used for characterization to confirm that the differences between extracted fingerprints are caused by the changes of the antenna under test and the configuration parameters of the test rather than the transmitter characteristics. The fingerprints of the antennas were established and extracted from data-independent fields of WLAN OFDM beacon frames. The signals were digitized then processed to extract fields of interest. The extracted fields were used to create the training and testing datasets. The training datasets of each test case are extracted from a training database, and used by a convolutional neural network (e.g., model instance 512) to determine parameters to produce an RF fingerprint from the selected antenna samples. The testing datasets were created from a testing database and used to test the convolutional neural network classification accuracy, as shown generally in the framework of FIG. 5.

FIG. 6A, FIG. 6B, FIG. 6C, and FIG. 6D illustrate different antenna configurations that were evaluated. The antenna structures 600A, 600B, 600C and 600D shown in FIG. 6A, FIG. 6B, FIG. 6C, and FIG. 6D, respectively, are righthand circularly polarized (RHCP) truncated-corner probe-fed (TCPF) patch antennas, selected for their straightforward footprint and manufacturability. Different operating frequencies of these antennas fall into a range of between about 5 GHz to about 6 GHz, covering different channels of the 5 GHz 802.11 bands, showing validation of the AMEF approach, in this illustrative example, such as for use in WLAN applications.

In one approach, physical features to establish the fingerprint can be generated using laser machining (e.g., ablative) techniques and laminate structures, as an illustrative example. The substrate 660 of the example of the antenna structure 600A of FIG. A is Rogers RO4003C, providing a relative dielectric constant of about 3.55, and presenting a maximum dissipation factor of about 0.0027. For these illustrative laser-machined examples, a thickness of the ceramic composite substrate is 1.524 mm, and a copper cladding is 17 micrometers. An LPKF U4 laser milling machine was used to remove the copper layer and to establish the conductive patch 662A of the antenna structure 600A. A Southwest 1014-33SF female SMA connector was attached to the ground plane and the patch using EPO-TEK H20E-PFC electrically conductive epoxy and M2x3 PEEK screws. Physical parameters of the laser machined example are shown in TABLE 2, below.

TABLE 2

LASER-MACHINED ANTENNA PARAMETERS

| Parameter | Value | Parameter | Value | Parameter | Value |
|---|---|---|---|---|---|
| $w_{pp1}$ [mm] | 14.2 | $T_{c1}$ [mm] | 2.35 | $P_{p1}$ [mm] | 3.5 |
| $H_p$ [mm] | 4.5 | ØH [mm] | 2 | $W_{p1}$ [mm] | 86 |

Figure 6A:
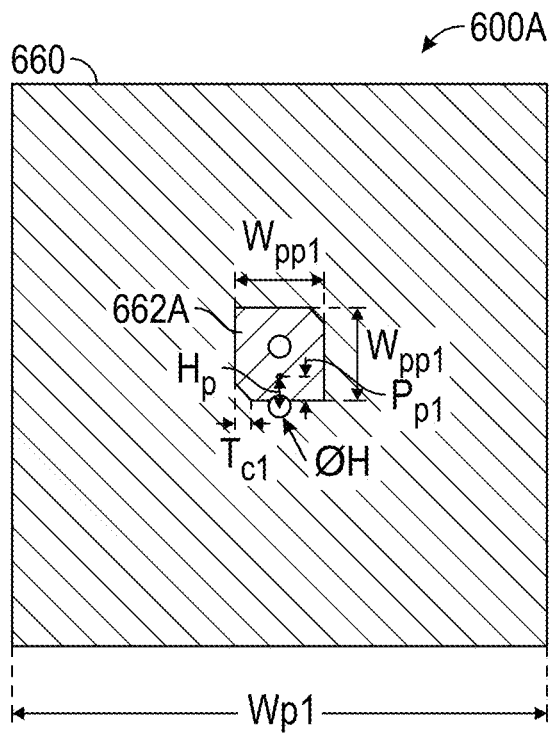
FIG. 6A, FIG. 6B, FIG. 6C, and FIG. 6D illustrate different antenna configurations that were evaluated.
Figure 6B:
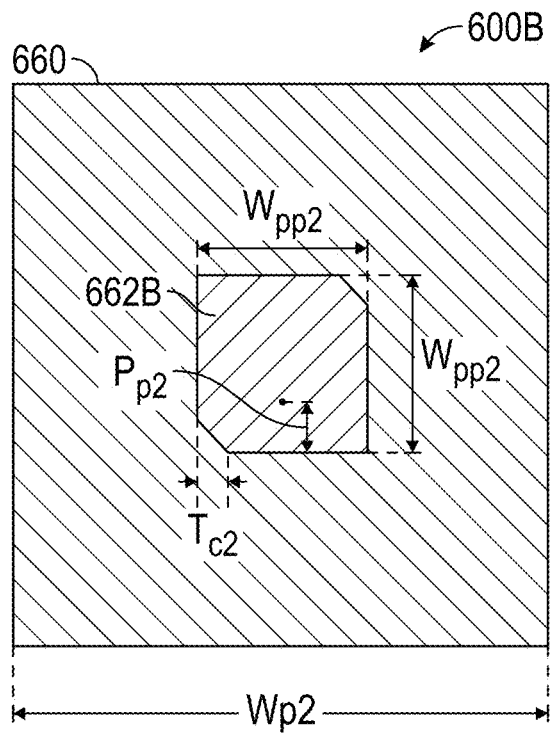
Figure 6C:
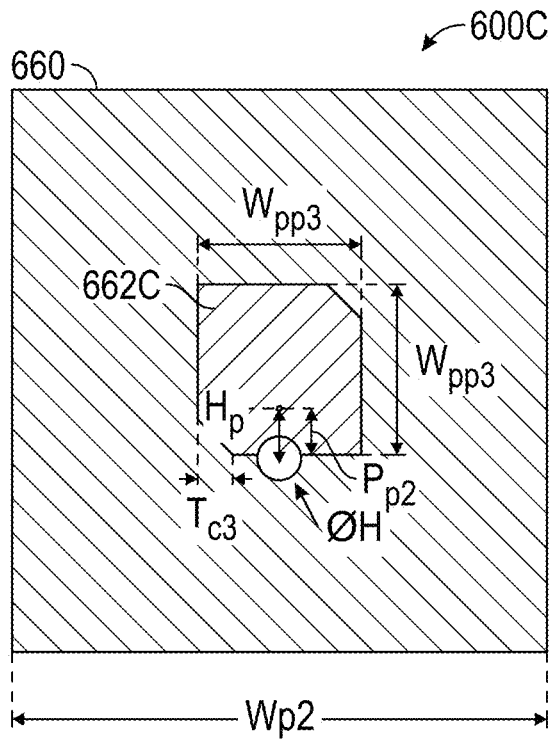
Figure 6D:
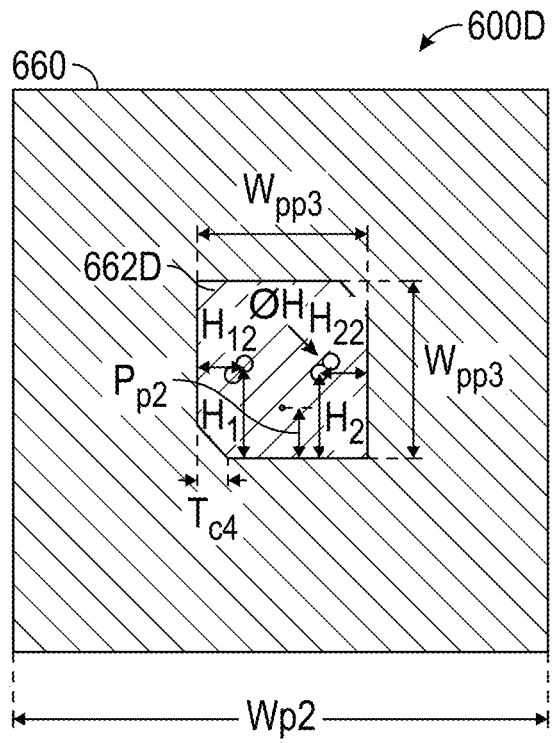

To evaluate the classification capabilities, three different additively manufactured antenna structures 600B, 600C, and 600D were also fabricated, shown in FIG. 6B, FIG. 6C, and FIG. 6D, respectively. One of the antenna configurations, antenna structure 600B in FIG. 6B, is an otherwise unmodified RHCP TCPF patch 662B antenna (referred to as "design A"), and the other two remaining examples are based on the same configuration as design A but including physical features to aid classification. The features include substrate 660 thickness variations and non-plated through holes with different sizes and locations: in one example, a single hole of 4 mm is added in one of the patch 662C edges (design B, corresponding to antenna structure 600C shown in FIG. 6C), and the last example in FIG. 6D contains a total of four 2 mm holes at specific positions of the patch 662D (design C, corresponding to antenna structure 600D in FIG. 6D). Physical parameters of the additively manufactured examples are shown in Table 3, below.

TABLE 3

ADDITIVELY MANUFACTURED ANTENNA PARAMETERS

| Parameter | Value | Parameter | Value | Parameter | Value |
|---|---|---|---|---|---|
| $w_{pp2}$ [mm] | 15.2 | $w_{pp3}$ [mm] | 16 | $T_{c2}$ [mm] | 2.9 |
| $T_{c3}$ [mm] | 3.2 | $T_{c4}$ [mm] | 2.8 | $P_{p2}$ [mm] | 3.5 |
| ØH [mm] | 2 | $H_p$ [mm] | 4.5 | $H_1$ [mm] | 8.5 |
| $H_2$ [mm] | 7.5 | $H_{12}$ [mm] | 3.4 | $H_{22}$ [mm] | 4.4 |
| $W_{p2}$ [mm] | 50 | | | | |

The additively manufactured antenna structures 600B, 600C, and 600D described herein as illustrative examples were fabricated by: (1) 3D printing of the substrate 660 using fused deposition modeling (FDM), (2) microdispensing of conductive ink (patch 662B, 662C, 662D structure), (3) drying of conductive ink (patch 662B, 662C, 662D), (4) brushing of conductive ink (ground plane on opposite face of the substrate 660), (5) drying of conductive ink (ground plane), (6) epoxying of an RF connector, (7) and curing of the epoxy. The substrate 660 in FIG. 6B, FIG. 6C, and FIG. 6D is an Acrylonitrile Butadiene Styrene (ABS) with a relative dielectric constant of 2.7. A thickness of the ABS substrates was 2 mm (designs A and C corresponding to FIG. 6B and FIG. 6D, respectively) and 3 mm (design B corresponding to FIG. 6C), manufactured using a daVinci 1.0 Pro 3D printer with FDM techniques, with temperatures of 220 degrees C. and 80 degrees C. for the nozzle and the bed, respectively. A layer height was set to 0.2 mm and the infill is 100%. The conductive ink used for these illustrative examples is DuPont CB028. The silver-based conductive ink was micro-dispensed, over the ABS substrate to create the patch pattern using an nScrypt 3Dn-Tabletop system, with a nozzle of 125 micrometers and 175 micrometers inner and outer diameters, respectively. A layer height was set to 80 micrometers, dispensed at a speed of 15 mm/s and a pressure of 14 psi. The ink was dried at 80 degrees C. for 30 minutes. For the ground plane, the ink was brushed and dried at 80 degrees C. for 30 minutes. An SMA antenna connector was attached to both planes of the antenna using EPO-TEK H20E-PFC electrically conductive epoxy, which was cured at 80 degrees C. for 3 hours.

For the results described herein, fingerprints of the antennas were established using WLAN OFDM beacon frames. The signals used for the classification approach comprise samples that are represented in the complex plane, having two components: the in-phase (I) value and the quadrature phase (Q) value. I/Q imbalance are considered as part of the received signals, because they are present due to mismatches between I and Q paths that are caused by the RF devices. Such imbalance can affect an amplitude, a phase, and a frequency of the received signals. For the results described herein illustratively, a total of ten different carrier frequencies were used, based on the available channels to perform the data collection: CH44—5.22 GHz, CH54—5.27 GHz, CH64—5.32 GHz, CH100—5.50 GHz, CH110—5.55 GHz, CH120—5.60 GHz, CH130—5.65 GHz, CH140—5.70 GHz, CH150—5.75 GHz, and CH160—5.80 GHz. A bandwidth of a respective channels is 20 MHz and the modulation technique was binary phase shift-keying (BPSK). Antennas under test were excited to transmit signals at the configured frequency channels to perform evaluation (e.g., training and later, classification).

The approach in the illustrative examples herein used raw I/Q samples and a static channel. The standard used is the IEEE 802.11 standard, particularly following the a/g/n/ac protocols, which are used by Wi-Fi routers to transmit beacon frames using, for example, Orthogonal Frequency Division Modulation (OFDM) non-high throughput (non-HT) format. The IEEE 802.11 standard family generally defines a packet-based protocol, in which a physical layer protocol data unit (PPDU) comprises two main parts: a preamble (SYNC) and a payload (DATA) field. The preamble has different parts; among others, the legacy long training field L-LTF. In the illustrative examples herein, a L-LTF of the preamble is used to provide RF fingerprints used to classify the antennas. The L-LTF field is generally the same for various routers, a second field in the 802.11 OFDM physical layer convergence protocol (PLCP) legacy preamble, presenting a data-independent characteristic that can be used for antenna identification or classification. This field is generally a component of very high throughput (VHT), high throughput (HT), and non-HT PPDUs. Symbols are assigned to sub-carriers −26 to −1 and 1 to 26, and its duration varies with the selected channel bandwidth: for a 20 MHz bandwidth, the duration is 8 microseconds.

The test configuration for evaluation of the illustrative examples herein included use of an ETS-Lindgren Far Field anechoic chamber to record the Wi-Fi signals transmitted by the antennas under test. As mentioned above, the testbed included two SDRs for transmission and reception, respectively, with a dipole antenna for reception, and the antennas under test for transmission. The SDRs were ADALM-PLUTO devices (available from Analog Devices, Inc.), having an operating frequency range from 70 MHz to 6000 MHz, a tunable channel bandwidth between 200 kHz and 20 MHz, and configurable transmission and reception gains. The SDRs were controlled by respective MATLAB codes for the receiver and the transmitter side, independently, for configuration of the frequency channel and the reception and transmission gains, respectively.

The code generated data for transmission on the transmitter side, and separate code was used to control digitization of the received data. Three different transmit antenna positions were evaluated inside the chamber, to analyze impact of a position of the antenna on classification performance. For a duration of the data collection, the antennas were maintained in the specified positions; therefore, any RF impairments were time-invariant. Generally, for the results described herein as illustrative examples, the transmitting antenna was configured to transmit beacon signals that the reception side received and processed until a specified count of received beacons were recorded. The beacons were labeled with a user-defined MAC address for analysis purposes and to identify the different transmission antennas. The receiver side digitized the received signal to provide raw I/Q data at the configured frequency, corresponding to the transmitter configuration, and verified the MAC address of the received beacons, to consider only received beacon signals conforming to the specified MAC address. When a valid beacon frame was detected, the L-LTF field was extracted and saved specifying the antenna sample used for transmission, the position of the antenna in the anechoic chamber, and the frequency channel used for the data collection. Training and testing databases were prepared for use with a model instance (e.g., a convolutional neural network).

Figure 7:
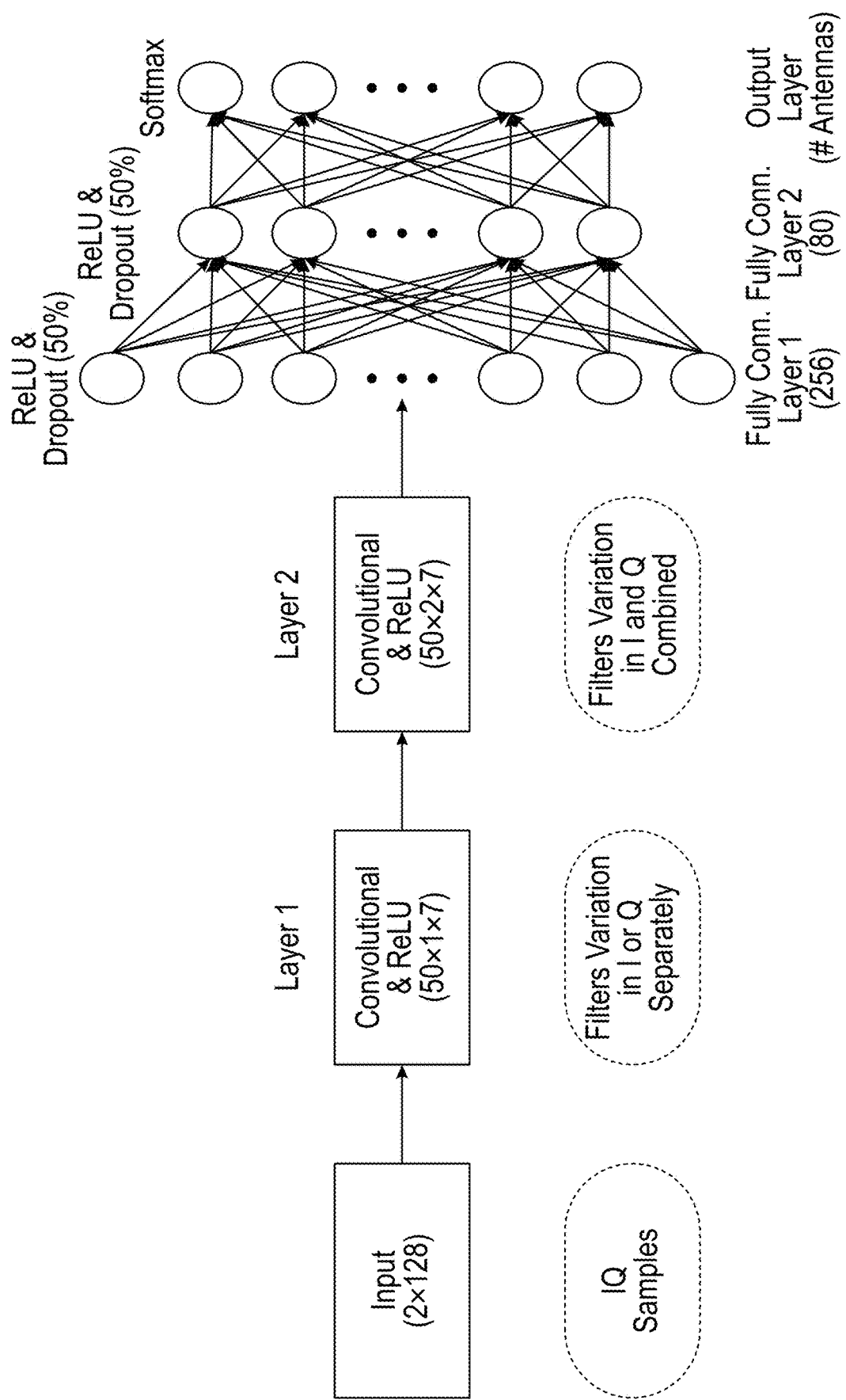
FIG. 7 illustrates generally a topology for a convolutional neural network (CNN), such as can be established to perform classification of signals corresponding to additively manufacture antenna transmissions.

FIG. 7 illustrates generally a topology for a convolutional neural network (CNN), such as can be established to perform classification of signals corresponding to additively manufacture antenna transmissions. Various machine learning techniques can be used to perform detection or classification of received signals for use in characterizing an unknown source antenna (or authenticating a known source antenna). Such techniques can work as a single or multiple class classifier with supervised (e.g., labeled) input data for training, or Unsupervised (e.g., unlabeled) input data for training. Unsupervised learning may be useful for outlier detection, as an illustrative example. In the illustrative examples herein, a supervised learning technique was used where collected data is labeled with antenna information. As an illustration, the examples herein used a convolutional neural network trained using raw time-series I/Q samples. The CNN architecture (as shown in FIG. 7) comprises two convolutional layers and three fully connected layers. The first layer extracts features from I and Q time-series representations independently; the second layer extracts features combining I and Q samples; and the last three layers work as a classifier of the previously extracted features. The input of the CNN is a sequence of raw I/Q samples, as real and imaginary values, respectively. The first convolution layer includes a total of 50 filters of size 7×1 to perform a convolution over the input data, detecting 7-samples variations in time over I and Q data sequences, separately, and generating 50 feature maps over the input sequence. The second convolution layer include filters that have a size of 7×2 to detect variations over both I and Q sequences at the same time, of the previously generated 50 feature maps.

In the example of FIG. 7, both convolution layers include a Rectifier Linear Unit (ReLU) layer that provides a non-linear transformation on each element of the output. The two fully connected layers have 256 and 80 neurons, respectively, and include a ReLu layer to extract non-linear combinations of the features computed in previous layers. A count of neurons for the third fully connected layer is equal to the count number of output options (e.g., different unique antennas or different classes of antennas), and contains a softmax classifier to output the probabilities of each input sample. The regularization parameter is set to 0.0001 and the weights of the network are computed and trained using an Adam optimizer with a learning rate of 0.0001. The Adam technique is based on stochastic optimization and uses first-order gradients. Out of the total count of recorded beacon frames from each antenna or case under analysis, 90% were used for training the CNN. Once the CNN is trained, remaining data was used for testing to analyze the accuracy of the classification of the source of the signal.

Various case studies were performed with the illustrative examples of the patch antennas mentioned above in relation to FIG. 6A, FIG. 6B, FIG. 6C, and FIG. 6D, using a classifier having a topology as shown in FIG. 7. In case (1), individual sample classification, all the antenna configurations and samples were used for training and testing. The signals were classified as part of one of the nine possible groups, providing information about the classification accuracy of individual samples. These examples take advantage of not only the engineered features included in respective antenna designs, but also of the inherent imperfections produced by their manufacturing process to distinguish between antenna samples from the same and different designs (e.g., different antenna classes or types). TABLE 4 presents the configuration parameters of the tests performed for this first case example.

TABLE 4

Case #1 - Test Configuration Parameters

| Test | Mode | Antennas | Position | Frequency |
|------|------|----------|----------|-----------|
| #1 | Training | All | 2 | CH120-5.60 GHz |
|  | Testing | All | 2 | CH120-5.60 GHz |

In case (2), all individual antenna samples were considered, but in different frequency channels. The goal in this case was to evaluate the frequency dependency of the antenna fingerprint. Antenna parameters can vary depending on the frequency channel used to collect signals for classification. A series of frequency channels can be evaluated using the same analysis scenario to determine whether such channelization impacts classification accuracy. TABLE 5 presents the configuration parameters of the tests performed for this second case.

TABLE 5

Case #2 - Test Configuration Parameters

| Test | Mode | Antennas | Position | Frequency |
|------|------|----------|----------|-----------|
| #1 | Training | All | 2 | CH44-5.22 GHz |
|  | Testing | All | 2 | CH44-5.22 GHz |
| #2 | Training | All | 2 | CH150-5.75 GHz |
|  | Testing | All | 2 | CH150-5.75 GHz |

In case (3), one antenna from each structural configuration (A, B, C) was selected for training. In this manner, classification can be performed by designs or types, instead of individually (uniquely by individual sample). A count of distinct fingerprints used for this type classification application is reduced as compared to the approaches in case (1) or (2), above, and accuracy of the approach can be enhanced by providing greater disparity between physical features of the antennas of each class. TABLE 6 presents the configuration parameters of the tests performed for this third case.

The differences between tests are primarily frequency channel used for data collection, antenna sample used for training, and the type of antenna (amongst the three additively manufactured configurations mentioned above in relation to FIG. 6B, FIG. 6C, and FIG. 6D).

TABLE 6

Case #3 - Test Configuration Parameters

| Test | Mode | Antennas | Position | Frequency |
|---|---|---|---|---|
| #1 | Training | All, #1 | 2 | CH120-5.60 GHz |
|  | Testing | All, #2, #3 | 2 | CH120-5.60 GHz |
| #2 | Training | All, #2 | 2 | CH120-5.60 GHz |
|  | Testing | All, #1, #3 | 2 | CH120-5.60 GHz |
| #3 | Training | All, #2 | 2 | CH100-5.50 GHz |
|  | Testing | All, #1, #3 | 2 | CH100-5.50 GHz |
| #4 | Training | All, #2 | 2 | CH100-5.50 GHz |
|  | Testing | All, #3 | 2 | CH100-5.50 GHz |
| #5 | Training | A-2, C-2 | 2 | CH100-5.50 GHz |
|  | Testing | A-3, C-3 | 2 | CH100-5.50 GHz |

In case (4), tests from other study cases are replicated using data from different positions to compare the obtained results. This case is focused on the analysis of the position impact classification accuracy. A static channel is used, with different transmitting antenna positions. TABLE 7 presents the configuration parameters of the tests performed for this fourth case. The differences between tests are position and the frequency channel used for data collection, and the type of antenna (amongst the three additively manufactured configurations mentioned above in relation to FIG. 6B, FIG. 6C, and FIG. 6D).

TABLE 7

Case #4 - Test Configuration Parameters

| Test | Mode | Antennas | Position | Frequency |
|---|---|---|---|---|
| #1 | Training | All | 1 | CH120-5.60 GHz |
|  | Testing | All | 1 | CH120-5.60 GHz |
| #2 | Training | All | 3 | CH120-5.60 GHz |
|  | Testing | All | 3 | CH120-5.60 GHz |
| #3 | Training | All | 2 | CH120-5.60 GHz |
|  | Testing | All | 1 | CH120-5.60 GHz |
| #4 | Training | All | 1 | CH120-5.60 GHz |
|  | Testing | All | 2 | CH120-5.60 GHz |
| #5 | Training | A-2, C-2 | 2 | CH100-5.50 GHz |
|  | Testing | A-3, C-3 | 1 | CH100-5.50 GHz |
| #6 | Training | A-2, C-2 | 1 | CH100-5.50 GHz |
|  | Testing | A-3, C-3 | 2 | CH100-5.50 GHz |
| #7 | Training | A-2, C-2 | 3 | CH100-5.50 GHz |
|  | Testing | A-3, C-3 | 3 | CH100-5.50 GHz |

Classification and identification results are presented below as an illustrative example, for laser-machined and additively manufactured antenna configurations. Scattering (S-parameters) of the antennas under test were measured using a Keysight E5071C ENA Vector Network Analyzer (VNA) calibrated with a Keysight N4433A ECal module, from 5 GHz to 6 GHz. The signals used to evaluate the different impacts of the different antenna features and to create the training and testing datasets for the CNN were recorded in an ETS-Lindgren Far-Field 12 ft×12 ft×24 ft antenna anechoic chamber to avoid radio-frequency interferences (RFI).

Figure 8:
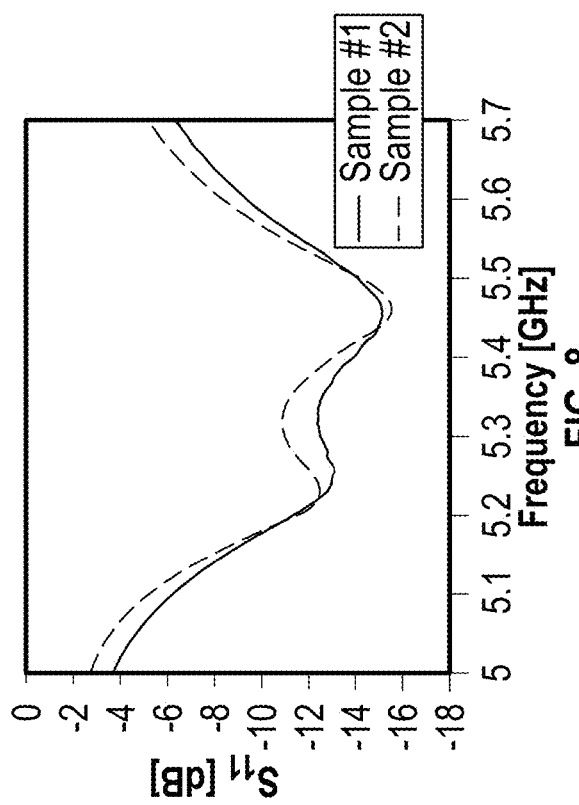
FIG. 8 illustrates generally an example of measured $S_{11}$ parameters for a laser-machined antenna structure.

FIG. 8 illustrates generally an example of measured $S_{11}$ parameters for a laser-machined antenna structure. In the illustration of FIG. 8, two antenna samples were used to test if the features added during the antennas manufacturing process can be used to classify their transmitted signals. The measured $S_{11}$ parameters of these laser-machined antennas shown in FIG. 8 illustrate that even though the antennas are based on the same physical configuration and the same manufacturing process is used for both, their parameters present some differences due to the variations associated with the manufacturing process. The laser-machined antenna structures were used to train a classifier. For this training and evaluation in this illustrative example, a total of 4000 beacon frames were recorded at CH64—5.32 GHz, from each antenna: 3600 samples were used for training and 400 samples were used for testing. The transmitter and receiver were in line-of-sight (LOS) and pointing directly at each other. The network topology of FIG. 7 converged in less than 300 iterations to 100% accuracy and 0 loss. All the testing beacon frames were correctly classified, correctly identifying the respective antenna used to transmit them. Use of the classifier with laser-machined antenna samples provided further support for the efficacy of using a similar approach for classification of additively manufactured antenna structures having physical features specifically introduced to enhance accuracy of classification or identification, as described below.

Figure 9A:
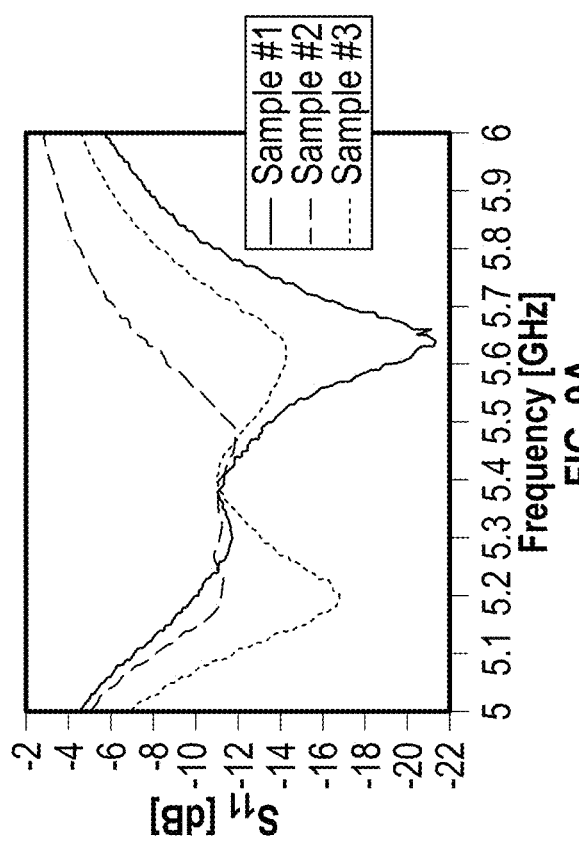
FIG. 9A.
Figure 9C:
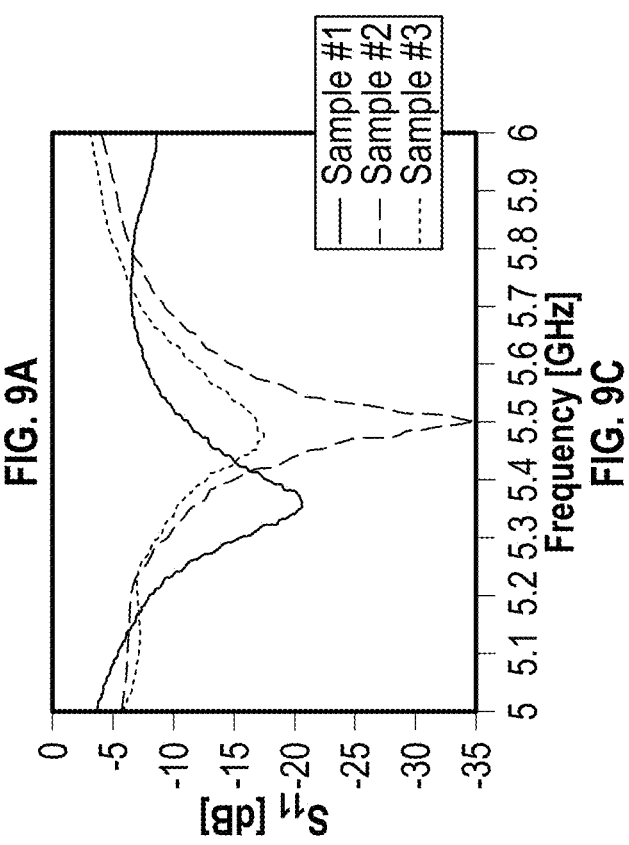
FIG. 9B, and FIG. 9C illustrate respective examples of measured $S_{11}$ parameters for three respective additively manufactured antenna configurations.
Figure 9B:
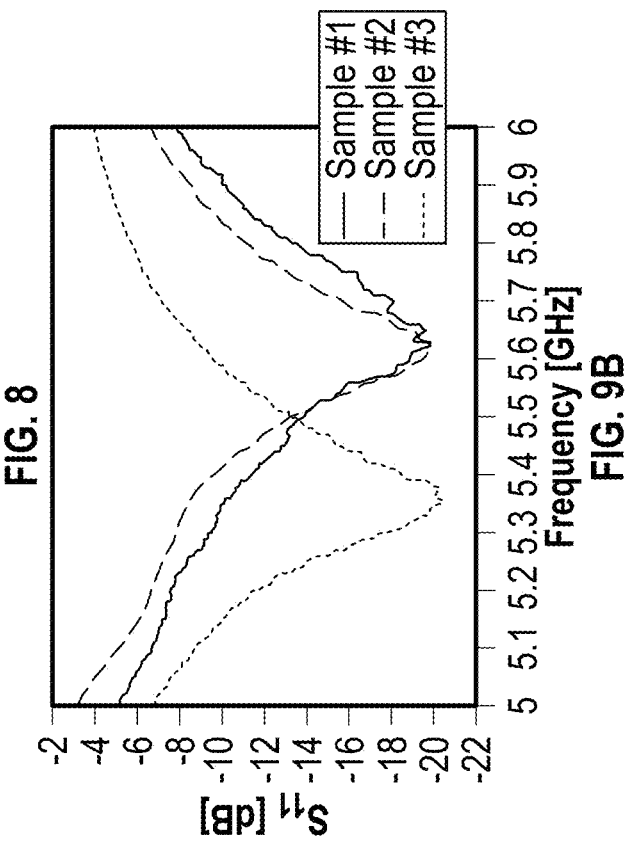
Figure 10:
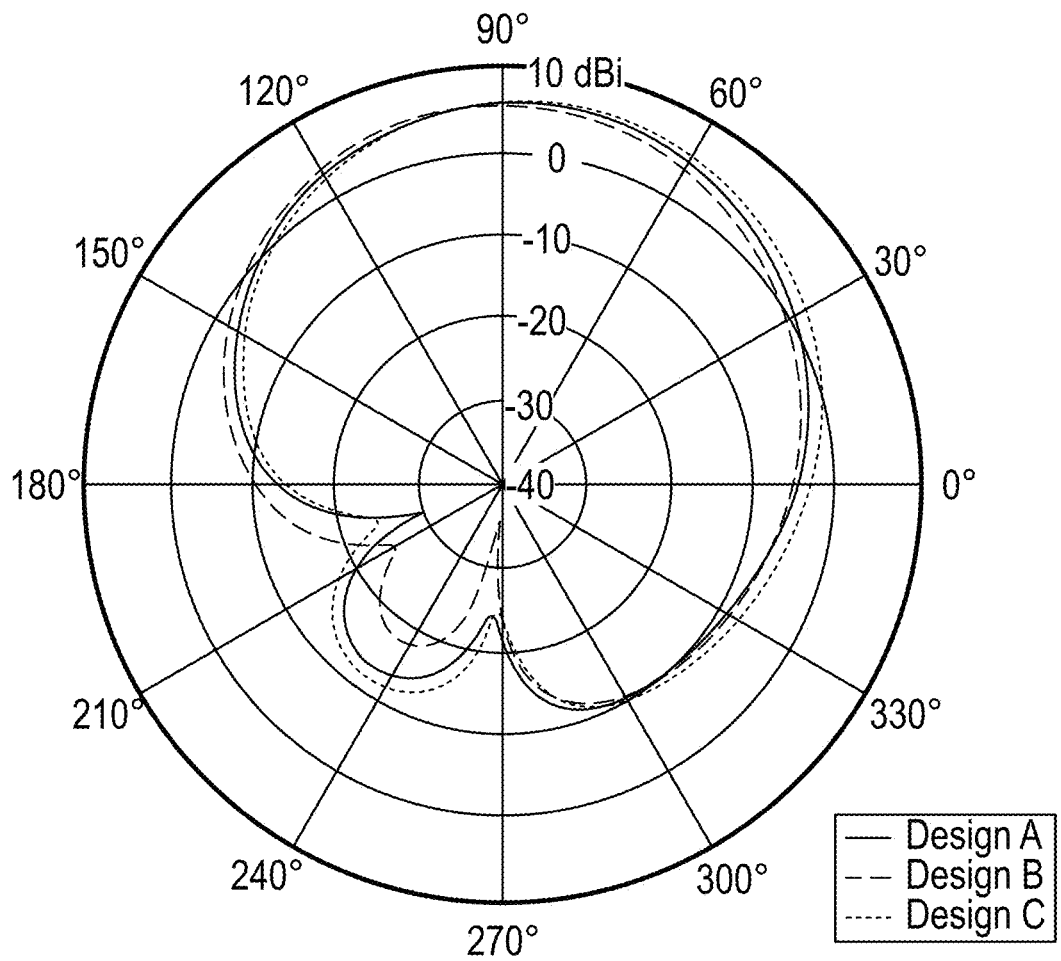
FIG. 10 illustrates generally an example of a simulated E-plane radiation pattern for three respective additively manufactured antenna configurations.

FIG. 9A, FIG. 9B, and FIG. 9C illustrate respective examples of measured Sn parameters for three respective additively manufactured antenna configurations. Generally, the three different additively manufactured antenna configurations correspond to the antenna structures 600B, 600C, and 600D, shown in FIG. 6B, FIG. 6C, and FIG. 6D, respectively, tested according to the different cases mentioned above, with three samples prepared for each of the three antenna configurations to provide nine different individual additively manufactured antennas, total. For all the cases, a total of 2000 beacon frames (LLTF fields) were captured from each antenna under test. Measured $S_{11}$ parameters of the antennas are shown in FIG. 9A (design A, three samples), FIG. 9B (design B, three samples), and FIG. 9C (design C, three samples), and FIG. 10 illustrates generally an example of simulated E-plane radiation pattern for the three respective additively manufactured antenna structures 600B, 600C, and 600D, shown in FIG. 6B, FIG. 6C, and FIG. 6D, respectively.

FIG. 9A, FIG. 9B, and FIG. 9C show the similarities of some antennas from different groups, and differences between respective antenna samples within a group. The tests presented in this document consider these differences when analyzing the classification accuracy in specific cases. The $S_{11}$ parameters can generally provide information about the differences of amplitude between each antenna sample in terms of frequency channel evaluated in each case and test, and such data can be used to identify outliers among the same antenna design (e.g., antennas that are part of the same group, but do not present similar results and could affect their classification accuracy).

Figure 11A:
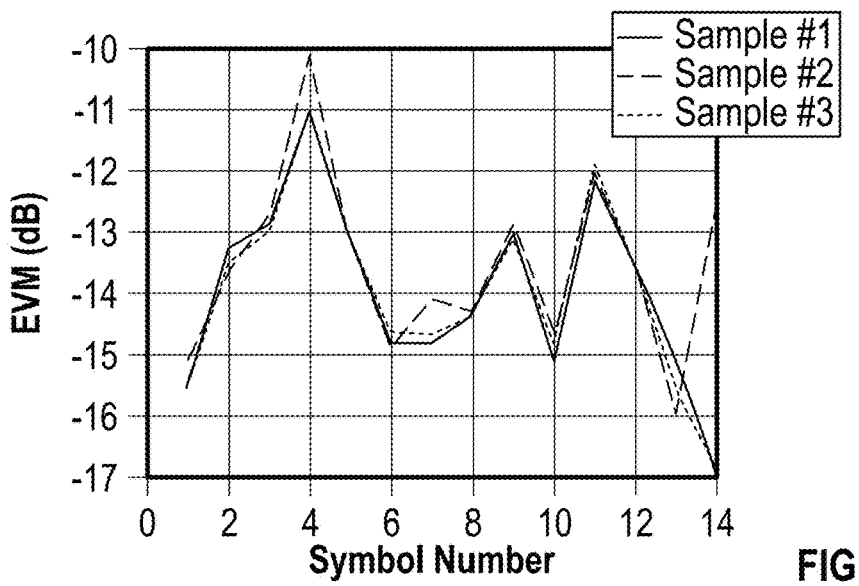
FIG. 11A, FIG. 11B, and FIG. 11C respectively illustrate generally an example of a measured error vector magnitude (EVM), root mean square (RMS), per data symbol, for three samples, for each of three different antenna structures.
Figure 11B:
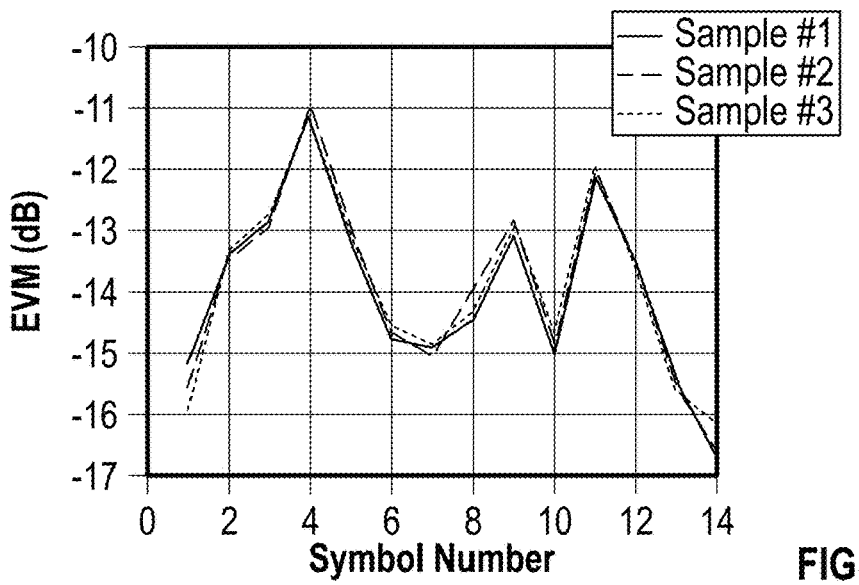
Figure 11C:
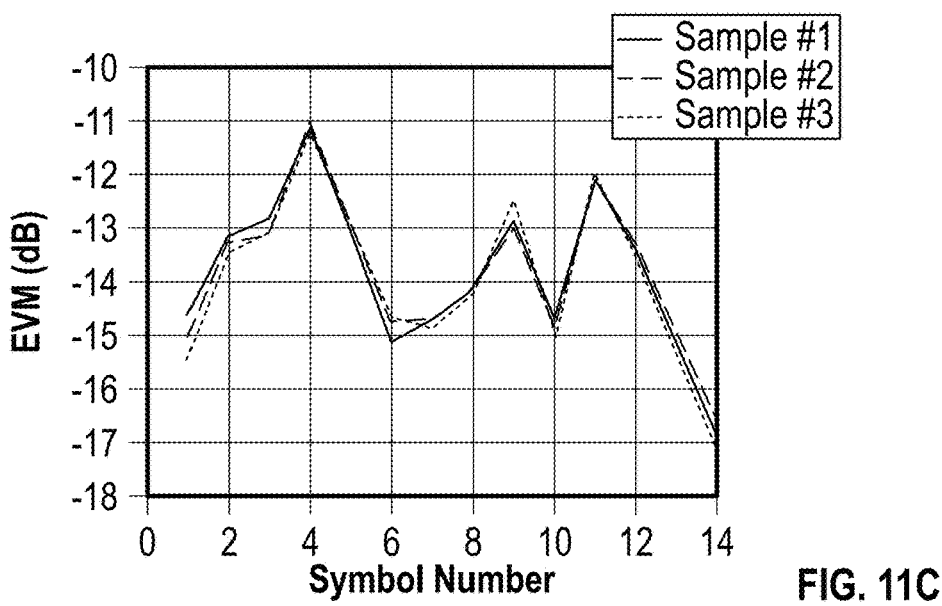
Figure 12A:
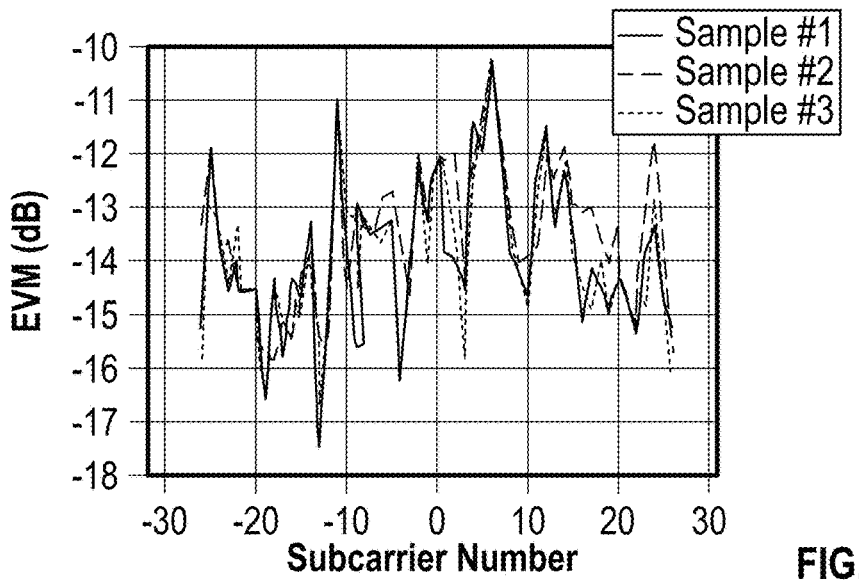
FIG. 12A, FIG. 12B, and FIG. 12C respectively illustrate generally an example of a measured error vector magnitude (EVM), root mean square (RMS), per subcarrier, for three samples, for each of three different antenna structures.
Figure 12B:
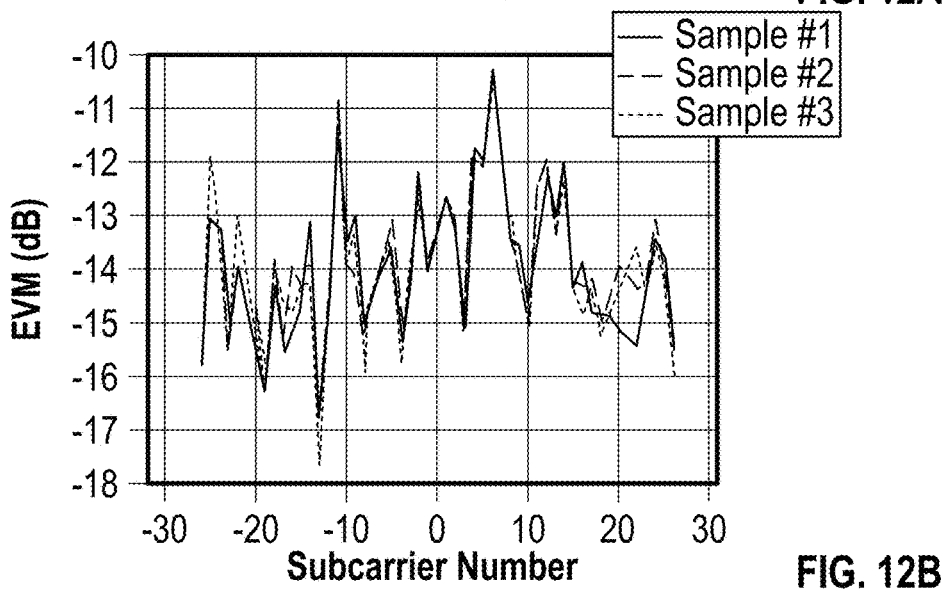
Figure 12C:
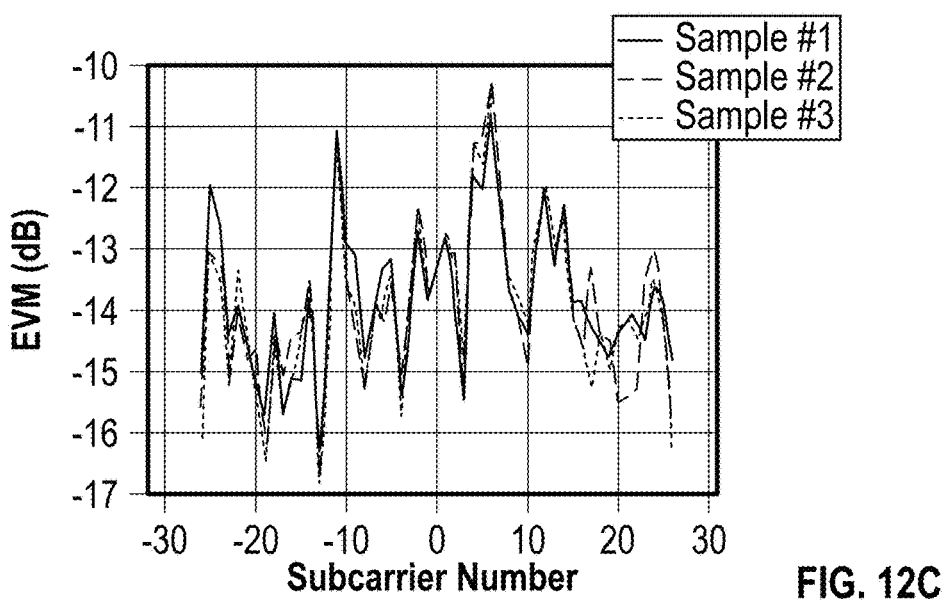

FIG. 11A illustrates generally an example of a measured error vector magnitude (EVM), root mean square (RMS), per data symbol, FIG. 11B illustrates an example of RMS EVM per subcarrier, and FIG. 11C shows a constellation of equalized data symbols (e.g., at CH120—5.60 gigahertz (GHz)) for three samples of the antenna structure 600B of FIG. 6B. Similarly, FIGS. 11B and 11C illustrate examples of measured symbol EVMs corresponding to three samples of the antenna structures 600C of FIG. 6C (in FIG. 11B) and 600D of FIG. 6D (in FIG. 11C). FIGS. 12B and 12C illustrate examples of measured subcarrier EVMs corresponding to three samples of the antenna structures 600C of FIG. 6C (in FIG. 12B) and 600D of FIG. 6D (in FIG. 12C). FIG. 13B and FIG. 13C show constellations of equalized data symbols corresponding to three samples of the antenna structures 600C of FIG. 6C (in FIG. 13B) and 600D of FIG. 6D (in FIG. 13C)

Figure 13A:
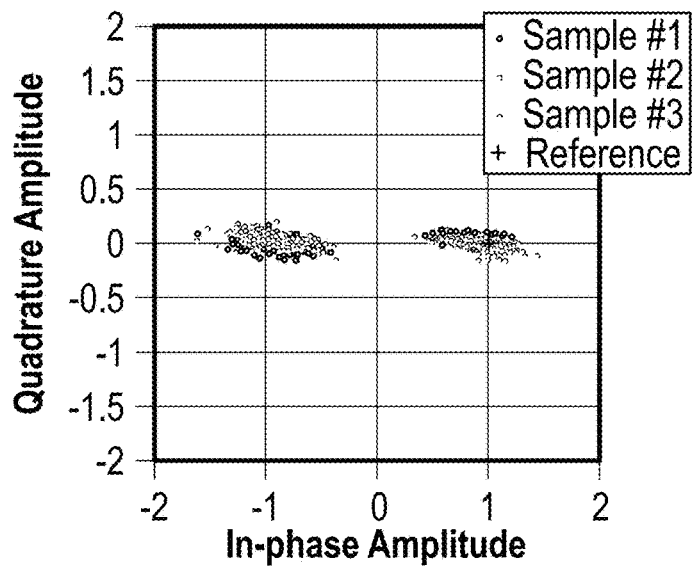
FIG. 13A, FIG. 13B, and FIG. 13C respectively illustrate generally an example of a constellation of equalized data symbols (e.g., at CH120—5.60 gigahertz (GHz)), for three samples, for each of three different antenna structures.
Figure 13B:
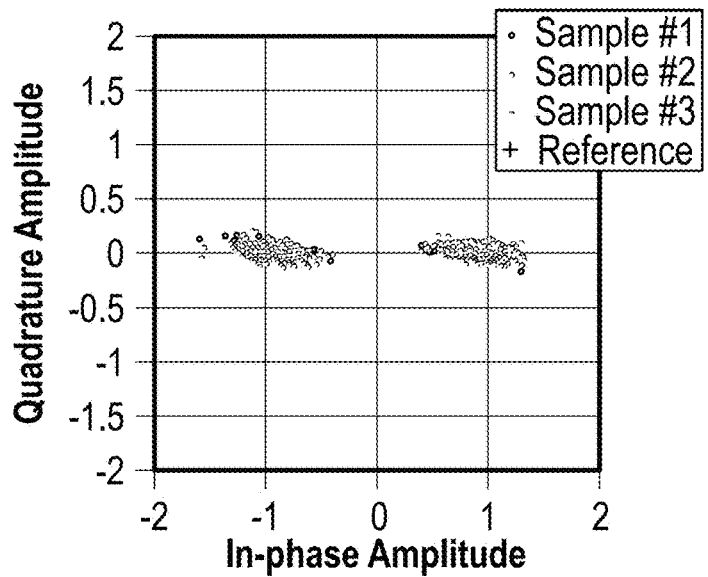
Figure 13C:
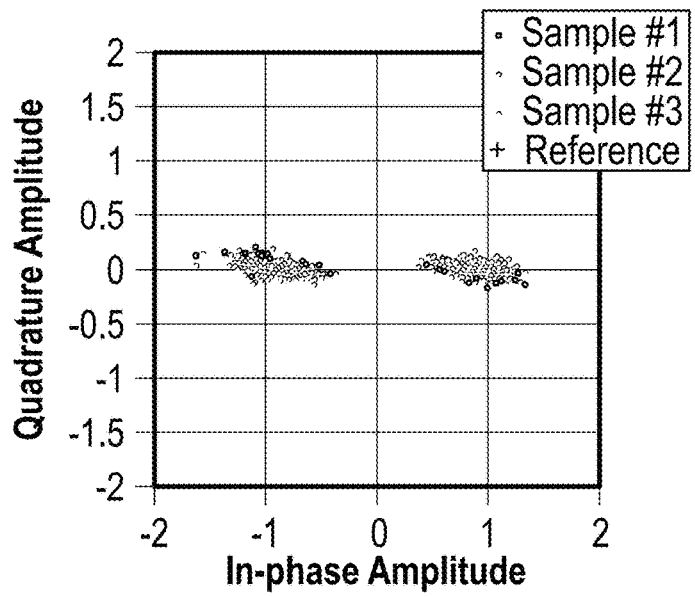

Generally, the I/Q constellations shown in FIG. 13A, FIG. 13B, and FIG. 13C can provide information about differences in amplitude and phase of the signals transmitted by each antenna, between samples of the same or different groups and the reference BPSK symbols, for specific transmitted packets. The EVM plots of FIG. 11A, FIG. 11B, FIG. 11C, FIG. 12A, FIG. 12B, and FIG. 12C present a visualization of the difference between the received symbols and the ideal (expected) symbols. Generally, EVM values provide an additional tool to characterize the performance deviations between RF transmitters, considering that the only part of the transmission components that changes during the tests are the antennas, in the illustrative examples herein. For the illustrative examples above, the EVM and I/Q constellation are shown for packets transmitted at CH120—5.60 GHz. These examples illustrate generally that a performance of the system varies due to the impact of the differences between antennas of the same group and between each individual sample. The use of a model-based classifier, such as a CNN, allows the exploitation of these variations in a manner that would otherwise not be easily observed or detected.

For cases (1) through (4) mentioned above, a resulting classification accuracy of the CNN topology of FIG. 7 is used to show an illustration of an AMEF-based classification approach. In the example of case (1), a line-of-sight position is used for both training and testing. TABLE 8 shows results of applying the trained CNN classifier. For received signals collected at 5.60 GHz, a classification accuracy of 100% is achieved, similar to the results mentioned above in relation to laser-machined antenna configurations.

TABLE 8

ADDITIVELY MANUFACTURED ANTENNAS
INDIVIDUAL CLASSIFICATION TESTS -
CONFUSION MATRIX (IN %).

| True Class | Predicted Class | | | | | | | | |
|---|---|---|---|---|---|---|---|---|---|
| | A-1 | A-2 | A-3 | B-1 | B-2 | B-3 | C-1 | C-2 | C-3 |
| A-1 | 100 | 0 | 0 | 0 | 0 | 0 | 0 | 0 | 0 |
| A-2 | 0 | 100 | 0 | 0 | 0 | 0 | 0 | 0 | 0 |
| A-3 | 0 | 0 | 100 | 0 | 0 | 0 | 0 | 0 | 0 |
| B-1 | 0 | 0 | 0 | 100 | 0 | 0 | 0 | 0 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 0 | 0 | 0 | 0 | 0 | 0 | 100 | 0 |
| C-3 | 0 | 0 | 0 | 0 | 0 | 0 | 0 | 0 | 100 |

Referring back to the plots of FIG. 9A, FIG. 9B, and FIG. 9C, various antennas present differences in their parameters with respect to frequency. Accordingly, antenna fingerprint differences may include establishing (e.g., training) a model-based classifier using multiple frequency ranges or multiple channels, for example, or by selecting a channel that provides enhanced classification accuracy. TABLE 9 shows results for frequency-dependent testing, and the test performed using CH44—5.22 GHz presents a lower classification accuracy (78.50/%) than the test performed using CH150—5.75 GHz (91.33%), but both tests do provide some classification capability across different frequencies. For the first test, the system is not able to accurately classify the antennas from design C, misclassifying those antennas as corresponding to design A. For the second test, some antennas are being erroneously identified as different antenna samples of the same, correct, design group. Without being bound by theory, it is assumed that use of larger samples encompassing different specified frequency ranges could enhance classification accuracy, and such accuracy may be dependent on frequency, generally.

TABLE 9

ADDITIVELY MANUFACTURED ANTENNAS
FREQUENCY DEPENDENCY TESTS -
CONFUSION MATRICES (IN %).

| True Class | Predicted Class | | | | | | | | |
|---|---|---|---|---|---|---|---|---|---|
| | A-1 | A-2 | A-3 | B-1 | B-2 | B-3 | C-1 | C-2 | C-3 |
| Test #1 | | | | | | | | | |
| A-1 | 100 | 0 | 0 | 0 | 0 | 0 | 0 | 0 | 0 |
| A-2 | 0 | 100 | 0 | 0 | 0 | 0 | 0 | 0 | 0 |
| A-3 | 0 | 0 | 95 | 0 | 0 | 0 | 0 | 5 | 0 |
| B-1 | 0 | 0 | 0 | 100 | 0 | 0 | 0 | 0 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 97 | 0 | 0 | 0 | 0 | 0 | 3 | 0 |
| C-3 | 91.5 | 0 | 0 | 0 | 0 | 0 | 0 | 0 | 8.5 |
| Test #2 | | | | | | | | | |
| A-1 | 100 | 0 | 0 | 0 | 0 | 0 | 0 | 0 | 0 |
| A-2 | 0 | 100 | 0 | 0 | 0 | 0 | 0 | 0 | 0 |
| A-3 | 0 | 9.5 | 90.5 | 0 | 0 | 0 | 0 | 0 | 0 |
| B-1 | 0 | 0 | 0 | 100 | 0 | 0 | 0 | 0 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 0 | 0 | 0 | 0 | 0 | 0 | 83 | 17 |
| C-3 | 0 | 0 | 0 | 0 | 0 | 51.5 | 0 | 0 | 48.5 |

Classification results for case (3) are from tests that use data from only one out of the three antenna samples of the same design group to classify the data from the other samples of the same group. The impact of the frequency channel, the sample used for training and the groups of antennas considered are analyzed as part of this illustrative example. TABLE 10, below, shows the results for the total of 5 tests. Test #1 shows an accuracy of 14.92% when the channel used is CH120—5.60 GHz. When the antenna samples used for training are changed for test #2, the classification accuracy of the system improves to a total of 34.58%. In test #3, the frequency channel is changed to CH100—5.50 GHz, providing an additional improvement on the classification accuracy of the system (50%). As it can be seen in TABLE 10, design C is maintained as the main source of classification errors for the tests, since antennas with designs A and B get partially or totally classified as antennas with design C. Without being bound by theory, this is believed attributable to similarities that these antennas present in terms of amplitude and phase, compared to the other antennas, so the system may have difficulty classifying them. For the next tests, the design groups and samples of antennas are reduced. In test #4, only two samples from each antenna are used, with signals from CH100—5.50 GHz, achieving a 100% classification accuracy. For the last test (#5), only samples from designs A and C are used, with only one antenna for training and one for testing from each group. In this case, the achieved classification accuracy is also 100%, demonstrating that the antenna type classification is possible ensuring enough differences between the antennas for the selected frequency channel and the constraints presented for the setup. In general, such results illustrate that physical features can be established during additive manufacturing that provide more disparity between frequency-dependent or symbol-dependent characteristics (or both) to enhance classification accuracy.

TABLE 10

ADDITIVELY MANUFACTURED
ANTENNAS TYPES CLASSIFICATION
TESTS-CONFUSION MATRICES (IN %).

| True Class | Predicted Class | | |
|---|---|---|---|
| | A | B | C |
| Test #1 | | | |
| A | 0 | 0 | 100 |
| B | 0 | 0 | 100 |
| C | 0 | 55.2 | 44.8 |
| Test #2 | | | |
| A | 3.8 | 0 | 96.2 |
| B | 0 | 50 | 50 |
| C | 0 | 50 | 50 |
| Test #3 | | | |
| A | 50 | 0 | 50 |
| B | 0 | 50 | 50 |
| C | 0 | 50 | 50 |
| Test #4 | | | |
| A | 100 | 0 | 0 |
| B | 0 | 100 | 0 |
| C | 0 | 0 | 100 |
| Test #5 | | | |
| A | 100 | | 0 |
| C | 0 | | 100 |

Classification results for case (4) show position dependency on classification accuracy. In this illustrative example, a line-of-sight transmit-receive configuration is shown to provide better classification approach. Each of the different positions evaluated are relatively close to each other within the anechoic chamber, but not all of the positions have the same impact on classification accuracy. These results also illustrate an impact of frequency dependency. In this test case, as discussed above, the channel is static, so a position of the source is always the same and training and testing samples are expected to be from the corresponding (same) position. Table 11 presents the results for the tests with different positions.

TABLE 11

ADDITIVELY MANUFACTURED ANTENNAS
POSITION DEPENDENCY TESTS -
CONFUSION MATRICES (IN %).

| True Class | Predicted Class | | | | | | | | |
|---|---|---|---|---|---|---|---|---|---|
| | A-1 | A-2 | A-3 | B-1 | B-2 | B-3 | C-1 | C-2 | C-3 |
| Test #1 | | | | | | | | | |
| A-1 | 100 | 0 | 0 | 0 | 0 | 0 | 0 | 0 | 0 |
| A-2 | 0 | 100 | 0 | 0 | 0 | 0 | 0 | 0 | 0 |
| A-3 | 0 | 0 | 100 | 0 | 0 | 0 | 0 | 0 | 0 |
| B-1 | 0 | 0 | 0 | 100 | 0 | 0 | 0 | 0 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 0 | 0 | 0 | 0 | 0 | 0 | 100 | 0 |
| C-3 | 0 | 0 | 0 | 0 | 0 | 0 | 0 | 0 | 100 |
| Test #2 | | | | | | | | | |
| A-1 | 95 | 0 | 0 | 0 | 0 | 0 | 0 | 0 | 5 |
| A-2 | 0 | 100 | 0 | 0 | 0 | 0 | 0 | 0 | 0 |
| A-3 | 0 | 0 | 58.5 | 0 | 0 | 0 | 0 | 41.5 | 0 |
| B-1 | 0 | 0 | 9 | 8 | 0 | 0 | 0 | 83 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 0 | 50.5 | 0 | 0 | 0 | 0 | 49.5 | 0 |
| C-3 | 58 | 0 | 0 | 0 | 0 | 0 | 0 | 0 | 42 |
| Test #3 | | | | | | | | | |
| A-1 | 100 | 0 | 0 | 0 | 0 | 0 | 0 | 0 | 0 |
| A-2 | 0 | 100 | 0 | 0 | 0 | 0 | 0 | 0 | 0 |
| A-3 | 0 | 0 | 100 | 0 | 0 | 0 | 0 | 0 | 0 |
| B-1 | 0 | 0 | 0 | 100 | 0 | 0 | 0 | 0 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 0 | 0 | 0 | 0 | 0 | 0 | 100 | 0 |
| C-3 | 0 | 0 | 0 | 0 | 0 | 0 | 0 | 0 | 100 |
| Test #4 | | | | | | | | | |
| A-1 | 100 | 0 | 0 | 0 | 0 | 0 | 0 | 0 | 0 |
| A-2 | 0 | 100 | 0 | 0 | 0 | 0 | 0 | 0 | 0 |
| A-3 | 0 | 0 | 100 | 0 | 0 | 0 | 0 | 0 | 0 |
| B-1 | 0 | 0 | 0 | 100 | 0 | 0 | 0 | 0 | 0 |
| B-2 | 0 | 0 | 0 | 0 | 100 | 0 | 0 | 0 | 0 |
| B-3 | 0 | 0 | 0 | 0 | 0 | 100 | 0 | 0 | 0 |
| C-1 | 0 | 0 | 0 | 0 | 0 | 0 | 100 | 0 | 0 |
| C-2 | 0 | 0 | 0 | 0 | 0 | 0 | 0 | 100 | 0 |
| C-3 | 0 | 0 | 0 | 0 | 0 | 0 | 0 | 0 | 100 |
| Test #5 | | | | | | | | | |
| A | 100 | | | | | | | | 0 |
| C | 0 | | | | | | | | 100 |
| Test #6 | | | | | | | | | |
| A | 100 | | | | | | | | 0 |
| C | 0 | | | | | | | | 100 |
| Test #7 | | | | | | | | | |
| A | 100 | | | | | | | | 0 |
| C | 0 | | | | | | | | 100 |

As shown in TABLE 11, above, a 100% classification accuracy is achieved, except test #2, demonstrating that small position changes can have an impact on the RF fingerprints, even though the classification accuracy is still relatively high. For test #1, the individual identification accuracy was 100% when evaluated with signals from CH120—5.60 GHz and a first position (designated #1), matching the results for position #2 from other case studies. For test #2, the position is changed to a third position (#3), and the accuracy is reduced to 72.56%, in which there are errors in the classification of specific antenna samples from different designs that present similar parameters, such as samples A-3 and B-2. Tests #3 and #4 aim show the impact of using different positions for training and testing. For the presented channel conditions and experiment setup in this illustrative example, a total accuracy is generally not affected by these changes, showing a 100% accuracy. Finally, tests #5-#7 reproduce the type of antenna design group classification experiments previously performed for CH100—5.50 GHz with only antenna samples from designs A and C. The differences between these tests are again based on the positions of the signals recorded for training and testing.

The examples above generally involved use of RHCP patch antenna configurations. Other configurations can be used. For example, an antenna can include another shape, such as a triangular patch. A conductive patch can define or otherwise include a circular aperture or slot. Such an antenna can include shorting vias between a patch structure and a reference plane, or a combination of apertures and shorting via features. As in other examples herein, such features can be established using an additive manufacturing approach, such as to facilitate classification using a model as also described elsewhere herein.

Figure 14:
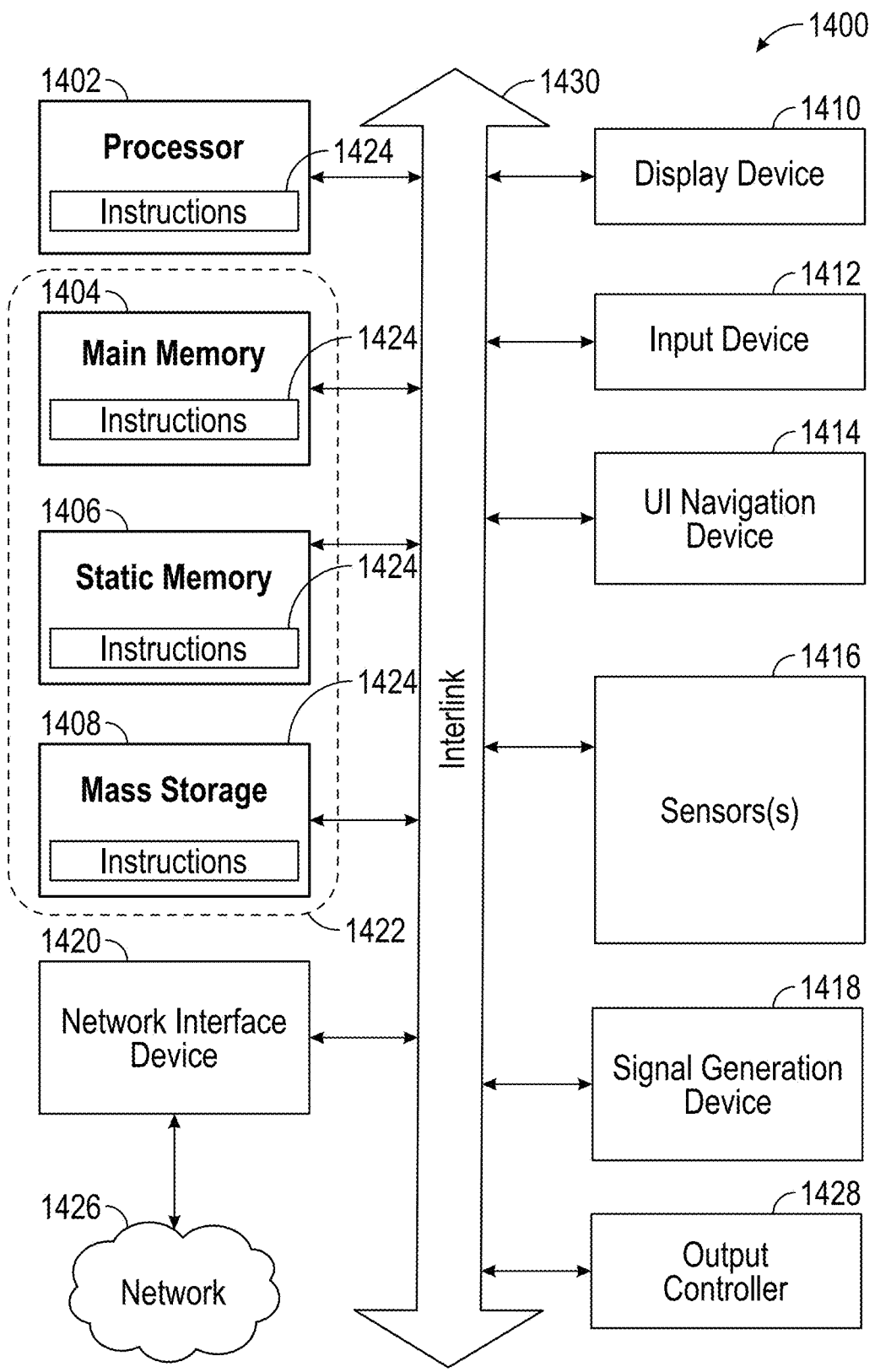
FIG. 14 illustrates a block diagram of an example comprising a machine upon which any one or more of the techniques (e.g., methodologies) discussed herein may be performed.

FIG. 14 illustrates a block diagram of an example comprising a machine 1400 upon which any one or more of the techniques (e.g., methodologies) discussed herein may be performed. Machine 1400 (e.g., computer system) may include a hardware processor 1402 (e.g., a central processing unit (CPU), a graphics processing unit (GPU), a hardware processor core, or any combination thereof), a main memory 1404 and a static memory 1406, connected via an interconnect 1430 (e.g., link or bus), as some or all of these components may constitute hardware for systems or related implementations discussed above.

Specific examples of main memory 1404 include Random Access Memory (RAM), and semiconductor memory devices, which may include storage locations in semiconductors such as registers. Specific examples of static memory 1406 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; or optical media such as CD-ROM and DVD-ROM disks.

The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch-screen display. The machine 1400 may include a mass storage device 1408 (e.g., drive unit), a signal generation device 1418 (e.g., a speaker), a network interface device 1420, and one or more sensors 1416, such as a global positioning system (GPS) sensor, compass, accelerometer, or some other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1408 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the mass storage device 1408 comprises a machine readable medium.

Specific examples of machine-readable media include, one or more of non-volatile memory, such as semiconductor memory devices (e.g., EPROM or EEPROM) and flash memory devices; magnetic disks, such as internal hard disks and removable disks; magneto-optical disks; RAM; or optical media such as CD-ROM and DVD-ROM disks. While the machine readable medium 1422 is illustrated as a single medium, the term "machine readable medium" may include a single medium or multiple media (e.g., a centralized or distributed database, or associated caches and servers) configured to store the one or more instructions 1424.

An apparatus of the machine 1400 includes one or more of a hardware processor 1402 (e.g., a central processing unit (CPU), a graphics processing unit (GPU), a hardware processor core, or any combination thereof), a main memory 1404 and a static memory 1406, sensors 1416, network interface device 1420, antennas, a display device 1410, an input device 1412, a UI navigation device 1414, a mass storage device 1408, instructions 1424, a signal generation device 1418, or an output controller 1428. The apparatus may be configured to perform one or more of the methods or operations disclosed herein.

The term "machine readable medium" includes, for example, any medium that is capable of storing, encoding, or carrying instructions for execution by the machine 1400 and that cause the machine 1400 to perform any one or more of the techniques of the present disclosure or causes another apparatus or system to perform any one or more of the techniques, or that is capable of storing, encoding or carrying data structures used by or associated with such instructions. Non-limiting machine-readable medium examples include solid-state memories, optical media, or magnetic media. Specific examples of machine readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); or optical media such as CD-ROM and DVD-ROM disks. In some examples, machine readable media includes non-transitory machine-readable media. In some examples, machine readable media includes machine readable media that is not a transitory propagating signal.

The instructions 1424 may be transmitted or received, for example, over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example, the network interface device 1420 includes one or more physical jacks (e.g., Ethernet, coaxial, or other interconnection) or one or more antennas to access the communications network 1426. In an example, the network interface device 1420 includes one or more antennas to wirelessly communicate using at least one of single-input multiple-output (SIMO), multiple-input multiple-output (MIMO), or multiple-input single-output (MISO) techniques. In some examples, the network interface device 1420 wirelessly communicates using Multiple User MIMO techniques. The term "transmission medium" shall be taken to include any intangible medium that is capable of storing, encoding or carrying instructions for execution by the machine 1400, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method, comprising:
wirelessly transmitting a modulated signal using specified frequency ranges using a first antenna;
wirelessly receiving and digitizing first received signals in the specified frequency ranges corresponding to the wirelessly transmitted modulated signal from the first antenna;
wirelessly transmitting a modulated signal using specified frequency ranges using a second antenna;
wirelessly receiving and digitizing second received signals in the specified frequency ranges corresponding to the wirelessly transmitted modulated signal from the second antenna; and
establishing a model using the first received signals and the second received signals, the model established to classify a third received signal as corresponding to either the first antenna or the second antenna;
wherein the first antenna and the second antenna are intentionally manufactured with differing physical features that intentionally cause the first antenna and the second antenna to differ in electrical performance when transmitting the modulated signal to facilitate classification, without otherwise compromising antenna performance.

2. The method of claim 1, wherein the model is established to classify the third received signal as corresponding to the first antenna or the second antenna uniquely.

3. The method of claim 1, wherein the model is established to classify the third received signal as corresponding to the first antenna or the second antenna as a class, wherein respective antennas sharing physical features corresponding to the first antenna or the second antenna define the class.

4. The method of claim 1, wherein a return loss of the first antenna is different from a return loss of the second antenna in at least one specified frequency range amongst the specified frequency ranges, due at least in part to a difference in a manufactured physical feature between the first antenna and the second antenna.

5. The method of claim 1, wherein the modulated signal comprises at least one training sequence.

6. The method of claim 1, wherein establishing the model comprises training a convolutional neural network using digitized in-phase and quadrature representations of the first received signals and the second received signals.

7. The method of claim 6, wherein the training the convolutional neural network comprises labeling the first received signals as corresponding to the first antenna and labeling the second received signals as corresponding to the second antenna.

8. The method of claim 1, comprising fabricating the first antenna and the second antenna using an additive manufacturing technique.

9. The method of claim 8, wherein the additive manufacturing technique comprises depositing a conductive layer including dispensing or printing a conductive species.

10. The method of claim 9, wherein the conductive layer defines at least a portion of a patch antenna structure.

11. The method of claim 8, wherein the additive manufacturing technique comprises ablating a portion of the first antenna or the second antenna during fabrication to establish the physical feature.

12. A method, comprising:
   wirelessly receiving and digitizing a received signal corresponding to a wirelessly transmitted modulated signal; and
   applying the received signal to an established model to classify the received signal as corresponding to either a first antenna or a second antenna;
   wherein the first antenna and the second antenna are intentionally manufactured with differing physical features that intentionally cause the first antenna and the second antenna to differ from each other in electrical performance when transmitting the modulated signal to facilitate classification, without otherwise compromising antenna performance.

13. The method of claim 12, wherein the model is established to classify the received signal as corresponding to a unique first antenna or a unique second antenna.

14. The method of claim 12, wherein the model is established to classify the received signal as corresponding to the first antenna or the second antenna as a class, wherein respective antennas sharing physical features corresponding to the first antenna or the second antenna define the class.

15. The method of claim 12, wherein the model comprises a convolutional neural network trained using digitized in-phase and quadrature representations of first received signals corresponding to transmission from the first antenna and second received signals corresponding to transmission from the second antenna.

16. The method of claim 12, wherein an additive manufacturing technique is used for fabrication of the first antenna and the second antenna comprising depositing a conductive layer including dispensing or printing a conductive species.

17. The method of claim 16, wherein the conductive layer defines at least a portion of a patch antenna structure.

18. A method for fabricating an antenna having a fingerprint detectable using an established model, the method comprising:
   fabricating a first antenna and a second antenna using an additive manufacturing technique, the additive manufacturing technique comprising depositing a conductive layer on a dielectric material;
   wherein the first antenna and the second antenna include respective additively manufactured physical features that intentionally differ to cause the first antenna and the second antenna to intentionally differ in electrical performance when transmitting a modulated signal, to facilitate classification, without otherwise compromising antenna performance; and
   wherein the first antenna and the second antenna are each configured to operate using specified frequency ranges including providing a specified return loss in the specified frequency ranges.

19. The method of claim 18, wherein a return loss of the first antenna is different from a return loss of the second antenna in at least one specified frequency range amongst the specified frequency ranges, due at least in part to a difference in an additively manufactured physical feature between the first antenna and the second antenna.

20. The method of claim 18, wherein the conductive layer defines at least a portion of a patch antenna structure.

* * * * *